(12) United States Patent
Bhogal et al.

(10) Patent No.: US 11,765,798 B2
(45) Date of Patent: *Sep. 19, 2023

(54) HIGH HEAT IN-SITU CAMERA SYSTEMS AND OPERATION METHODS

(71) Applicant: June Life, Inc., San Francisco, CA (US)

(72) Inventors: Nikhil Bhogal, San Francisco, CA (US); Matthew Van Horn, San Francisco, CA (US); Nikko Lubinski, San Francisco, CA (US); Mathias Watson Schmidt, San Francisco, CA (US)

(73) Assignee: June Life, Inc., San Francisco, CA (US)

( * ) Notice: Subject to any disclaimer, the term of this patent is extended or adjusted under 35 U.S.C. 154(b) by 169 days.

This patent is subject to a terminal disclaimer.

(21) Appl. No.: 17/398,679

(22) Filed: Aug. 10, 2021

(65) Prior Publication Data

US 2021/0368593 A1    Nov. 25, 2021

Related U.S. Application Data

(63) Continuation of application No. 16/268,348, filed on Feb. 5, 2019, now Pat. No. 11,116,050.

(60) Provisional application No. 62/628,221, filed on Feb. 8, 2018.

(51) Int. Cl.
| | |
|---|---|
| H05B 6/68 | (2006.01) |
| H05B 6/64 | (2006.01) |
| H04N 23/51 | (2023.01) |
| H04N 23/57 | (2023.01) |

(52) U.S. Cl.
CPC ............. *H05B 6/68* (2013.01); *H04N 23/51* (2023.01); *H04N 23/57* (2023.01); *H05B 6/6423* (2013.01); *H05B 6/6447* (2013.01)

(58) Field of Classification Search
CPC ........ H04N 23/51; H04N 23/52; H04N 23/57; H05B 6/6423; H05B 6/6447; H05B 6/68
USPC ....... 219/702, 704, 705, 709, 711, 497, 502, 219/506; 126/19 R, 21 A, 21 R, 198, 126/193, 369; 99/337
See application file for complete search history.

(56) References Cited

U.S. PATENT DOCUMENTS

| | | |
|---|---|---|
| 3,453,997 A | 7/1969 | Klepzig |
| 3,911,893 A | 10/1975 | Baker et al. |
| 4,363,957 A | 12/1982 | Tachikawa et al. |
| 4,415,790 A | 11/1983 | Diesch et al. |
| 5,154,940 A | 10/1992 | Budzyna et al. |

(Continued)

FOREIGN PATENT DOCUMENTS

| | | |
|---|---|---|
| CN | 1900858 A | 1/2007 |
| CN | 101044362 A | 9/2007 |

(Continued)

OTHER PUBLICATIONS

U.S. Appl. No. 12/216,999, filed Jul. 14, 2008, Kim, et al.

(Continued)

*Primary Examiner* — Quang T Van
(74) *Attorney, Agent, or Firm* — Jeffrey Schox; Diana Lin

(57) ABSTRACT

An imaging system for a high-heat cooking appliance, including a camera system including an optical sensor, a lens, and a set of light emitters; and a camera cooling mechanism thermally connected to the camera system.

20 Claims, 19 Drawing Sheets

(56) References Cited

U.S. PATENT DOCUMENTS

| | | |
|---|---|---|
| 5,170,024 A | 12/1992 | Hanatani et al. |
| 5,360,965 A | 11/1994 | Ishii et al. |
| 5,361,681 A | 11/1994 | Hedstroem et al. |
| 5,412,448 A | 5/1995 | Kunishige |
| 5,498,856 A | 3/1996 | Carlsson |
| 5,546,475 A | 8/1996 | Bolle et al. |
| 5,663,758 A * | 9/1997 | Linville .............. G03B 37/005 348/E5.025 |
| 5,918,589 A | 7/1999 | Valle et al. |
| 6,060,701 A | 5/2000 | McKee et al. |
| 6,299,921 B1 | 10/2001 | Loeffler et al. |
| 6,310,964 B1 | 10/2001 | Mohan et al. |
| 6,359,270 B1 | 3/2002 | Bridson |
| 6,384,384 B1 | 5/2002 | Connolly et al. |
| 6,759,635 B2 | 7/2004 | Lile |
| 6,821,016 B2 | 11/2004 | Sato et al. |
| 6,856,247 B1 | 2/2005 | Wallace |
| 6,862,494 B2 | 3/2005 | Hu et al. |
| 7,013,661 B2 | 3/2006 | Gatling et al. |
| 7,102,107 B1 | 9/2006 | Chapman |
| 7,150,891 B2 | 12/2006 | Greiner et al. |
| 7,445,381 B2 | 11/2008 | Rund et al. |
| 7,516,692 B2 | 4/2009 | Pirkle et al. |
| 7,566,168 B2 | 7/2009 | Rund et al. |
| 7,663,502 B2 | 2/2010 | Breed |
| 7,845,823 B2 | 12/2010 | Mueller et al. |
| 8,091,543 B2 | 1/2012 | Baumann et al. |
| 8,193,474 B2 | 6/2012 | Harris |
| 8,426,777 B2 | 4/2013 | Elston et al. |
| 8,555,776 B2 | 10/2013 | Debord et al. |
| 8,766,144 B2 | 7/2014 | McLoughlin et al. |
| 8,931,400 B1 | 1/2015 | Allen |
| 9,017,751 B2 | 4/2015 | Rauh |
| 9,041,799 B2 | 5/2015 | Bielstein |
| 9,069,340 B2 | 6/2015 | Minvielle |
| 9,149,058 B2 | 10/2015 | Bilet et al. |
| 9,414,444 B2 | 8/2016 | Libman et al. |
| 9,432,561 B2 * | 8/2016 | Samuels .............. G03B 17/56 |
| 9,460,633 B2 | 10/2016 | Minvielle |
| 9,494,322 B2 | 11/2016 | Luckhardt et al. |
| 9,528,972 B2 | 12/2016 | Minvielle |
| 9,564,064 B2 | 2/2017 | Minvielle |
| 9,644,847 B2 | 5/2017 | Bhogal et al. |
| 9,664,436 B1 | 5/2017 | Hall et al. |
| 9,791,206 B1 | 10/2017 | Hall et al. |
| 9,927,129 B2 | 3/2018 | Bhogal et al. |
| 9,933,166 B2 | 4/2018 | Matarazzi et al. |
| 10,024,544 B2 | 7/2018 | Bhogal et al. |
| 10,024,736 B2 | 7/2018 | Nivala et al. |
| 10,057,946 B2 | 8/2018 | Mills et al. |
| 10,092,129 B2 | 10/2018 | Jenkins et al. |
| 10,207,734 B2 | 2/2019 | Watanabe |
| 10,559,186 B2 | 2/2020 | Allen |
| 10,739,013 B2 | 8/2020 | Bhogal |
| 10,801,734 B2 | 10/2020 | Bhogal et al. |
| 10,845,060 B2 | 11/2020 | Bhogal et al. |
| 10,852,005 B2 | 12/2020 | Faraldi et al. |
| 11,116,050 B1 * | 9/2021 | Bhogal .................. H05B 6/68 |
| 2002/0005406 A1 | 1/2002 | Fukunaga et al. |
| 2003/0139843 A1 | 7/2003 | Hu et al. |
| 2005/0046584 A1 | 3/2005 | Breed |
| 2005/0047134 A1 | 3/2005 | Mueller et al. |
| 2005/0133019 A1 | 6/2005 | Kim et al. |
| 2005/0211104 A1 | 9/2005 | Harris et al. |
| 2006/0185523 A1 | 8/2006 | Wiedemann et al. |
| 2006/0218057 A1 | 9/2006 | Fitzpatrick et al. |
| 2006/0219234 A1 | 10/2006 | Larsen |
| 2007/0001012 A1 | 1/2007 | Kim et al. |
| 2007/0007279 A1 | 1/2007 | Chun et al. |
| 2007/0029306 A1 | 2/2007 | Chun et al. |
| 2007/0042091 A1 | 2/2007 | Rund et al. |
| 2007/0125760 A1 | 6/2007 | Kim et al. |
| 2007/0215599 A1 | 9/2007 | Kahler |
| 2008/0029078 A1 | 2/2008 | Baumann et al. |
| 2008/0043809 A1 | 2/2008 | Herbert |
| 2008/0110999 A1 | 5/2008 | Jerovsek |
| 2008/0120188 A1 | 5/2008 | Mobley et al. |
| 2008/0193614 A1 | 8/2008 | Greiner et al. |
| 2009/0134151 A1 | 5/2009 | Bogatin et al. |
| 2009/0274805 A1 | 11/2009 | Schonemann |
| 2010/0006558 A1 | 1/2010 | McLoughlin et al. |
| 2010/0021606 A1 | 1/2010 | Rauh |
| 2010/0134620 A1 | 6/2010 | Bielstein |
| 2010/0138075 A1 | 6/2010 | Boer et al. |
| 2010/0145483 A1 | 6/2010 | McGonagle et al. |
| 2010/0147823 A1 | 6/2010 | Anderson et al. |
| 2010/0320189 A1 | 12/2010 | Buchheit |
| 2011/0002677 A1 | 1/2011 | Cochran et al. |
| 2011/0123689 A1 | 5/2011 | Luckhardt et al. |
| 2011/0127252 A1 | 6/2011 | Yu et al. |
| 2011/0253693 A1 | 10/2011 | Lyons et al. |
| 2011/0284518 A1 | 11/2011 | Elston et al. |
| 2012/0017882 A1 | 1/2012 | Kitaguchi et al. |
| 2012/0038549 A1 | 2/2012 | Mandella et al. |
| 2012/0076351 A1 | 3/2012 | Yoon et al. |
| 2012/0099761 A1 | 4/2012 | Yoon et al. |
| 2012/0100269 A1 | 4/2012 | Polt |
| 2012/0125921 A1 | 5/2012 | Shim et al. |
| 2012/0157696 A1 | 6/2012 | Chopra et al. |
| 2012/0170247 A1 | 7/2012 | Do |
| 2012/0288595 A1 | 11/2012 | Randall et al. |
| 2013/0052310 A1 | 2/2013 | Stanford |
| 2013/0084369 A1 | 4/2013 | Smrke |
| 2013/0092680 A1 | 4/2013 | Cartwright et al. |
| 2013/0092682 A1 | 4/2013 | Mills et al. |
| 2013/0171304 A1 | 7/2013 | Huntley |
| 2013/0176116 A1 | 7/2013 | Jung et al. |
| 2013/0186887 A1 | 7/2013 | Hallgren et al. |
| 2013/0269539 A1 | 10/2013 | Polt |
| 2013/0277353 A1 | 10/2013 | Joseph et al. |
| 2013/0306052 A1 | 11/2013 | Price et al. |
| 2013/0306627 A1 | 11/2013 | Libman et al. |
| 2014/0026762 A1 | 1/2014 | Riefenstein |
| 2014/0039650 A1 | 2/2014 | Baraille et al. |
| 2014/0086274 A1 | 3/2014 | Henke |
| 2014/0199455 A1 | 7/2014 | Bilet et al. |
| 2014/0203012 A1 | 7/2014 | Corona et al. |
| 2014/0297467 A1 | 10/2014 | Soller et al. |
| 2015/0037472 A1 | 2/2015 | Fung et al. |
| 2015/0056344 A1 | 2/2015 | Luckhardt |
| 2015/0136760 A1 | 5/2015 | Lima et al. |
| 2015/0285513 A1 | 10/2015 | Matarazzi et al. |
| 2015/0289324 A1 | 10/2015 | Rober et al. |
| 2016/0063734 A1 | 3/2016 | Divakaran et al. |
| 2016/0242240 A1 | 8/2016 | Lee et al. |
| 2016/0273778 A1 | 9/2016 | Son et al. |
| 2016/0278563 A1 | 9/2016 | Choudhary |
| 2016/0283822 A1 | 9/2016 | Imai et al. |
| 2016/0327279 A1 | 11/2016 | Bhogal et al. |
| 2016/0327281 A1 | 11/2016 | Bhogal et al. |
| 2017/0074522 A1 | 3/2017 | Cheng |
| 2017/0150842 A1 | 6/2017 | Young et al. |
| 2017/0176019 A1 | 6/2017 | Bhogal et al. |
| 2017/0224161 A1 | 8/2017 | Li et al. |
| 2017/0332841 A1 | 11/2017 | Reischmann |
| 2018/0292093 A1 | 10/2018 | Bhogal et al. |
| 2018/0299138 A1 | 10/2018 | Faraldi et al. |
| 2018/0324908 A1 | 11/2018 | Denker et al. |
| 2019/0110638 A1 | 4/2019 | Li et al. |
| 2019/0200652 A1 | 7/2019 | Jellema et al. |
| 2019/0234617 A1 | 8/2019 | Bhogal et al. |
| 2019/0250043 A1 | 8/2019 | Wu et al. |
| 2019/0354810 A1 | 11/2019 | Samel et al. |
| 2020/0063978 A1 | 2/2020 | Erbe et al. |
| 2020/0069103 A1 | 3/2020 | Baldwin et al. |
| 2020/0088412 A1 | 3/2020 | Bhogal et al. |
| 2020/0096203 A1 | 3/2020 | Bhogal et al. |
| 2020/0103120 A1 | 4/2020 | Bhogal et al. |
| 2020/0182480 A1 | 6/2020 | Bhogal et al. |
| 2020/0182481 A1 | 6/2020 | Bhogal et al. |
| 2020/0292177 A1 | 9/2020 | Bhogal et al. |
| 2020/0300479 A1 | 9/2020 | Chadwick et al. |
| 2020/0400317 A1 | 12/2020 | Bhogal et al. |

(56) References Cited

U.S. PATENT DOCUMENTS

| 2021/0102708 A1 | 4/2021 | Bhogal et al. |
| 2021/0131669 A1 | 5/2021 | Bhogal et al. |
| 2021/0148577 A1 | 5/2021 | Bhogal et al. |

FOREIGN PATENT DOCUMENTS

| CN | 101504158 A | 8/2009 |
| CN | 201353794 Y | 12/2009 |
| CN | 202392848 U | 8/2012 |
| CN | 103234228 A | 8/2013 |
| CN | 103501618 A | 1/2014 |
| CN | 103592227 A | 2/2014 |
| CN | 104042124 A | 9/2014 |
| CN | 203914599 U | 11/2014 |
| CN | 104246375 A | 12/2014 |
| DE | 19828333 A1 | 12/1999 |
| DE | 102005030483 A1 | 1/2007 |
| DE | 202008000135 | 3/2008 |
| DE | 102008043722 A1 | 5/2010 |
| DE | 102012204229 A1 | 9/2013 |
| DE | 102017220884 A1 | 5/2019 |
| EP | 0298858 A1 | 1/1989 |
| EP | 0899512 A1 | 3/1999 |
| EP | 1179711 A1 | 2/2002 |
| EP | 1746350 A2 | 1/2007 |
| EP | 2149755 A1 | 2/2010 |
| EP | 2515044 A1 | 10/2012 |
| EP | 2618634 A1 | 7/2013 |
| GB | 1163509 A | 9/1969 |
| GB | 1195750 A | 6/1970 |
| JP | 11-63509 | 3/1999 |
| JP | 2004187778 A | 7/2004 |
| JP | 2005276171 A | 10/2005 |
| JP | 201353794 | 3/2013 |
| WO | 2006128696 A1 | 12/2006 |
| WO | 2009012874 A2 | 1/2009 |
| WO | 2013167333 A1 | 11/2013 |
| WO | 2014086486 A2 | 6/2014 |
| WO | 2014086487 A1 | 6/2014 |
| WO | 2015059931 A1 | 4/2015 |
| WO | 2019232113 A1 | 12/2019 |

OTHER PUBLICATIONS

U.S. Appl. No. 13/059,486, filed Aug. 26, 2009, Sakane, et al.
U.S. Appl. No. 13/978,413, filed Apr. 19, 2012, Ruther.
U.S. Appl. No. 14/205,587, filed Mar. 12, 2014, Chadwick, et al.
U.S. Appl. No. 14/205,593, filed Mar. 12, 2014, Chadwick, et al.
U.S. Appl. No. 15/510,544, filed Oct. 9, 2015, Kondo, et al.
"Automated Fruit Recognition for Super Markets and Food Stores, Fraunhofer, http://www.iosb.fraunhofer.de/servlet/is/33328/, accessed online Nov. 13, 2014."
"Electrolux launches CombiSteam Pro Smart", http://www.homeappliancesworld.com/2018/03/08/electrolux-launches-combisteam-pro-smart/, downloaded from internet on Jan. 18, 2019, 2 pages.
Karimi, Davood "Deep learning with noisy labels: exploring techniques and remedies in medical image analysis" arXiv:1912.02911v4 [cs.CV] Mar. 20, 2020.
Sun, Da-Wen; "Computer Vision Technology For Food Quality Evaluation", Second Edition, Academic Press, 2016.
"Colloids, Gels and Suspensions", https://kitchenscience.scitoys.com/Gels (c) 2021 included as "Colloids_Gels_and_Suspensions_Your_Mother_Was_A_Chemist.pdf", 2021.
"Steam Characteristics", ThermExcel, https://therexcel.com/english/taples/vap_eau.htm, included as thermExcel_steam_charateristics_2003.pdf, 2003.
Chen, Pengfei, et al., "Understanding and Utilizing Deep Neural Networks Trained with Noisy Labels", Proceeding of the 36th International Conference on Machine Learning, Long Beach, California, PMLR 97, 2019.
Harris, William, "How Molecular Gastronomy Works", https://science.howStuffWorks.com/innovation/edible-innovations/molecular-gastronomy.htm accessed in 2021 included as "HowStuffWorks_How_Molecular_Gastronomy_Works.pdf", 2021.
Li, Xin, et al., "On-Line Temperature Estimation for Noisy Thermal Sensors Using a Smoothing Filter-Based Kalman Predictor", Sensors, 2018, 18, 433, www.mdpi.com/journal/sensors.
Reitermanova, Z., et al., "Data Splitting", WDS '10 Proceedings of Contributed Papers, Part I, 31-36, 2010.

* cited by examiner

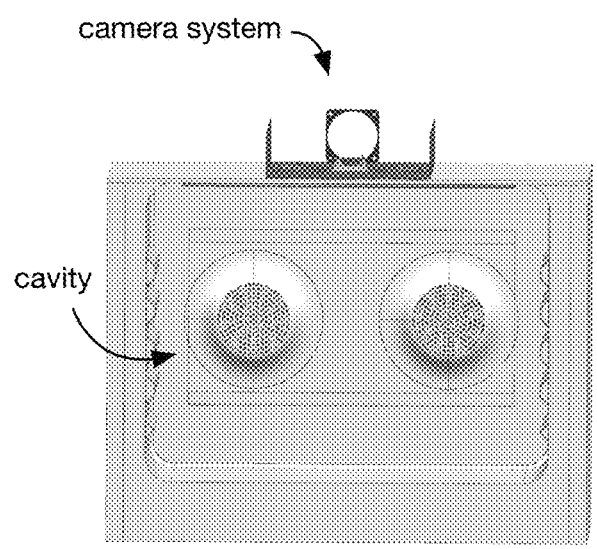
FIGURE 13E
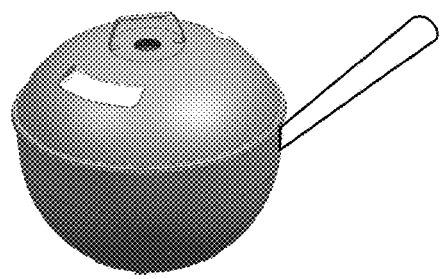
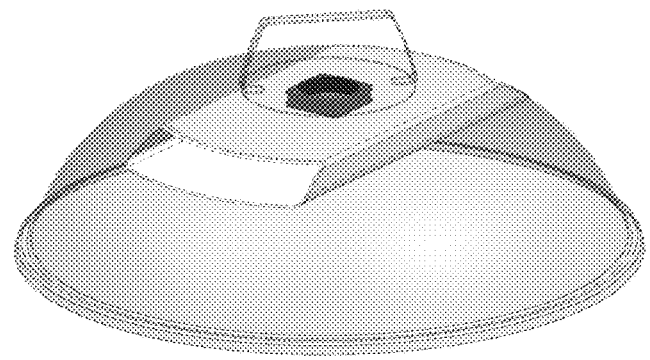
FIGURE 14A　　　　　　　　　　　　FIGURE 14B cooking appliance superior surface of cooking appliance

SECTION A-A

HIGH HEAT IN-SITU CAMERA SYSTEMS AND OPERATION METHODS

CROSS-REFERENCE TO RELATED APPLICATIONS

This application is a continuation of U.S. application Ser. No. 16/268,348, filed 5 Feb. 2019, which claims the benefit of U.S. Provisional Application No. 62/628,221, filed 8 Feb. 2018, each of which is incorporated herein in its entirety by this reference.

This application is related to U.S. application Ser. No. 16/008,478 filed 14 Jun. 2018, which is a continuation of U.S. application Ser. No. 15/450,546 filed 6 Mar. 2017, which is a continuation of U.S. application Ser. No. 15/147,597, filed 5 May 2016, which claims the benefit of U.S. Provisional Application No. 62/157,325 filed 5 May 2015, and to U.S. application Ser. No. 15/888,395 filed 5 Feb. 2018, which is a continuation of U.S. application Ser. No. 15/170,678 filed 1 Jun. 2016, which claims the benefit of U.S. Provisional Application No. 62/169,323, filed 1 Jun. 2015, each of which is incorporated in its entirety by this reference.

TECHNICAL FIELD

This invention relates generally to the optical systems field, and more specifically to a new and useful thermal management system for in-situ cameras within high heat environments in the optical systems field.

BACKGROUND

This invention can confer several benefits over current high heat camera systems and operation methods thereof.

First, in some variations, the invention can confer the benefit of maintaining a camera system below a threshold temperature which could otherwise damage one or more components of the camera system. In specific examples, for instance, reaching a threshold temperature can trigger any or all of: turning off or lowering the temperature of a host system in which the camera systems is placed, notifying a user, retracting a removable camera assembly, or any other suitable outcome.

Second, in some variations, the invention can confer the benefit of minimizing the heating of the camera system from both a heating element (e.g., resistive heating element, coil, calrod, etc.) of the host system as well as from heat generated by the camera system itself, such as by the operation of one or more electronic components. In some embodiments, for instance, a first cooling component can be dedicated to minimizing heat transfer from a cavity of the host system (e.g., oven) to the camera system, while a second cooling component can be dedicated to maximizing heat transfer from the camera system away to the ambient environment. Alternatively, a single cooling component can be implemented, a single source of heat can be addressed, or the cooling mechanism can be otherwise implemented.

Additionally or alternatively, the invention can confer the benefit of addressing multiple types of heat transfer, such as any combination of convective heat transfer, conductive heat transfer, and radiative heat transfer. In some embodiments, for instance, a heat shield having an infrared coating or a lens having an infrared or reflective coating is implemented to minimize radiative heat transfer in combination with a heat sink enclosing the camera system to maximize convective and/or conductive heat transfer away from the camera system.

In some variations, the invention includes a modular camera system, which can confer at least one or more of the following benefits: easy installation of the camera system in a variety of different types and models of host system (e.g., oven, grill, microwave, etc.), easy replacement of the camera system in the event of damage or routine use (e.g., camera system wear-and-tear, without having to replace the host system, etc.), removal of the camera system depending on an operation mode of the host system (e.g., during an oven cleaning mode), removal of the camera system in a dangerous condition (e.g., extremely high heat operation), or any other suitable benefit.

In some embodiments, for instance, the modular camera system is self-contained within an enclosure (e.g., heat sink housing) configured to be installed (e.g., retrofitted) into variety of host systems (e.g., ceiling of oven host system, lid of grill, etc.), an example of which is shown in FIG. 17. Additionally or alternatively, in some embodiments, the camera system includes a removable apparatus (e.g., sliding tray) configured to remove the camera system from the host system during predetermined operation modes and/or dangerous environments.

In some variations, the invention confers the benefit of providing a sealed (e.g., fully sealed, partially sealed, hermetically sealed, etc.) enclosure for the elements of the camera system. In some embodiments, for instance, the camera system is hermetically sealed within a conductive heat sink enclosure, which can function to: protect the camera system from ingress of smoke, food matter, and other substances; minimize heat transfer from hot air within the host system cavity to the camera system; transfer heat away from the camera system to the enclosure; increase a surface area at which heat is dissipated away from the camera system through convective heat transfer; and/or any other suitable function.

In some embodiments, for instance, the camera system is enclosed in a hermetically sealed metal box, which protects the camera system from any debris present in the oven cavity, as well as provides a large surface area configured to remove heat generated by the camera system through convective heat transfer enabled by placement of the box within an air flow path of the oven host system.

In some variations, the invention confers the benefit of enabling (e.g., through the design and selection of a cooling mechanism) the placement of a camera within or proximal to a host system cavity. This is an advantage over current systems, which typically circumvent the high heat environment of the cavity through placement of a camera on an external surface (e.g., transparent door) of the host system, as a camera placed in the host system cavity can obtain a top-down view of food items placed in the host system. Having this top-down view (as opposed to a front view, side view, angled view, etc.) has been shown in some embodiments to enable better approximations of the doneness of food, size of food, characterization of food type, and other parameters which can result in more precise cooking parameters (e.g., temperature, time, transition between operation modes, etc.) to be used in the cooking of said food. Additionally or alternatively, the images captured from this view can be more desirable to a user, producing, for instance, top-down time lapse views of the food item cooking. Additionally or alternatively, one or more camera systems can be placed in any suitable location of the host system, inside or outside a cavity.

Additionally or alternatively, the invention can confer any other suitable benefits.

BRIEF DESCRIPTION OF THE FIGURES

FIGS. 13A-13E are schematic representations of an example of an oven host system, including: an isometric view of the assembled oven, an isometric view of the oven with the top removed, an isometric view of the oven with the door removed, a bottom front corner view of the oven with the door removed, and an elevation view of the oven with the door removed.

FIGS. 14A-14E are schematic representations of an example of a host system with a lid or cover, including: an isometric view of the assembled host system, a transparent view of the host system cover, an example of the camera system for the host system, a transparent example of the camera system for the host system, and an isometric view of the host system cover from the bottom left.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
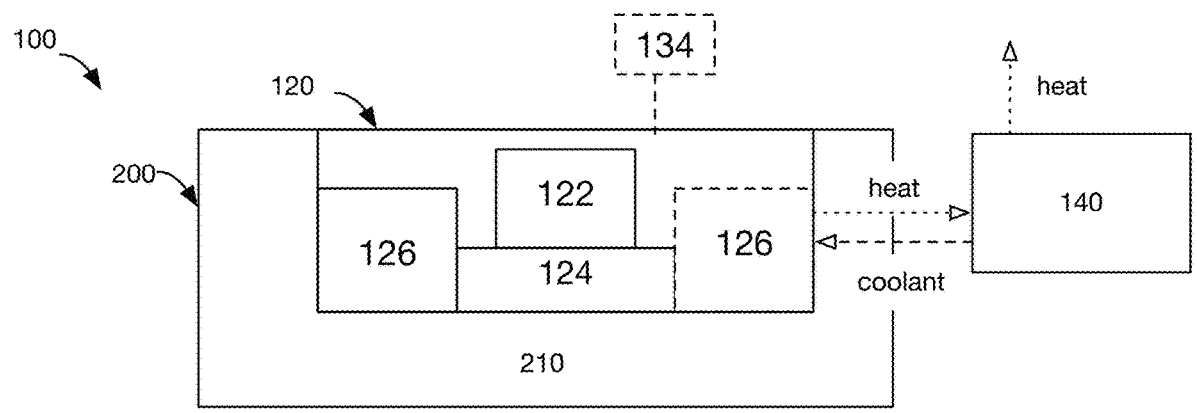
FIG. 1 is a schematic representation of the in-situ camera system for high-heat environments.

As shown in FIG. 1, the high-heat, in-situ camera system includes a camera system including an optical sensor, a lens, and a set of light emitters; and a camera cooling mechanism thermally connected to the camera system. The system functions to maintain the temperature of the camera (or components thereof) below a predetermined temperature during high-temperature operation. For example, the system maintains the camera lens temperature below the predetermined temperature during high-temperature operation.

2. System

The system 100 is preferably arranged in a high-heat environment, such as a host system 200, which can include, but is not limited to: a furnace, grill (example shown in FIGS. 14A-14E and FIGS. 15A-15E), or oven (examples shown in FIGS. 2, 3, 13A-13E, and 16A-16F), that is capable of operating in high temperature mode (e.g., above 500° F., 600° F., 700° F., 800° F., 900° F., etc.). In one example, the system 100 can be arranged within a self-cleaning oven capable of heating the cavity temperature to over 800° F. to burn off food soils. In a specific example, the system 100 is arranged in an oven similar to that disclosed in U.S. application Ser. Nos. 15/450,546 and 15/888,395. However, the system 100 can be arranged within, built into, integrated with, or otherwise located in any suitable host system or environment.

The host system in which the system 100 is integrated preferably defines at least one internal cavity, such that a food item to be cooked by the host system is placed within the internal cavity (herein equivalently referred to as a first internal cavity, cooking cavity, and/or main internal cavity). This can be, for instance, the main cavity of an oven, the space within a grill, or any other suitable space to receive a food item. The host system can additionally include any number of additional internal cavities, which can function to receive multiple food items (e.g., configured to be cooked at different temperatures). Additionally or alternatively, an additional internal cavity (equivalently referred to herein as a second internal cavity and/or secondary internal cavity) can function to provide cooling and/or ventilation for another internal cavity. In embodiments of the host system having multiple internal cavities, the internal cavities can be fluidly connected, selectively fluidly connected (e.g., through the actuation of a valve, through the selective covering of a set of ventilation apertures, etc.), fluidly isolated (e.g., through one or more panels of the cooking appliance), or otherwise configured. In embodiments having separated internal cavities, the cavities can be separated by any or all of: air gaps, vacuum gaps, insulative material (e.g., foam), conductive material (e.g., metal), one or more panels of an oven host system, a lid of an oven host system, or any other suitable material.

In some variations of the host system (e.g., an oven host system, a host system as shown in FIGS. 16A-16F, etc.), the host system defines a first internal cavity in which a food item is configured to be placed and a second internal cavity at least partially surrounding the first internal cavity. In a specific example, a second internal cavity is arranged over (superior to) the first internal cavity, where the second internal cavity functions to receive a modular camera system.

The system 100 is preferably used while the host system 200 is in operation, but can additionally or alternatively be used at any suitable time. For example, the system 100 can sample images of the host system cavity 210 during host system operation. In a specific example, the host system 200 is an oven, and the system can sample images of food cooking within the oven in real- or near-real time.

The system 100 is preferably controlled by an on-board processing system (e.g., CPU, GPU, microprocessor, etc.), but can alternatively be controlled by a remote computing system (e.g., user device, server system, etc.), or otherwise controlled. In one variation, the system 100 is operated upon selection of the predetermined mode. In a second variation, the system 100 is operated in response to determination that the environment temperature (e.g., cavity temperature) has or will exceed the threshold temperature (e.g., based on cavity temperature sensors, heat modeling, etc.). In a third variation, the system 100 is operated in response operation instruction receipt. In a fourth variation, the system 100 is operated in response to determination that the cavity satisfies high-heat operation requirements. In one example, these high-heat operation requirements include identifying food soiling within the oven cavity (e.g., occupying more than a threshold percentage of the oven cavity; located in a predetermined position or on a predetermined component, such as the heating elements; etc.; example shown in FIG. 3). However, the system 100 can be operated in any suitable manner at any suitable time.

2.1 System: Camera System.

The camera system 120 of the system 100 functions to sample images of the host system's cavity 210 during host system operation. The images can be live streamed to a remote device 300, be used to monitor the state(s) of the object(s) within the host system cavity 210, or be otherwise used. In one example, sequential frames of food cooking in an oven cavity (e.g., a video) that are sampled by the camera system can be streamed to a remote system (e.g., a user device). In a second example, parameters of the cooking food, such as color, sheen, or size, can be extracted from the frames and used to determine the food state (e.g., internal temperature, doneness, crispiness, etc.). This food state can further be optionally used to operate one or more parameters of the host system (e.g., time until shutoff, temperature, operation mode, planned transition between operation modes, etc.), determine and/or transmit one or more notifications (e.g., text message to a user device, message to be displayed on a display of the host system, call to a user on a user device, call to emergency personnel, etc.), to determine and/or trigger transmission of one or more alerts or alarms (e.g., audible indicator from a speaker of the host system and/or user device), or used for any other suitable outcome. In a third example, the frames can be used to determine the state of the oven cavity. In a specific example, the frames are used to verify that the oven cavity has been cleaned (e.g., after a self-cleaning cycle). The state of the oven cavity can further be used to produce one or more outputs, such as the ones described above and/or any other suitable outputs (e.g., to notify a user that the oven has been cleaned, to instruct a user of a subsequent required process such as wiping away ash from the self-cleaning cycle, etc.). In a second specific example, the frames are used to identify dirty regions within the cavity, and optionally to dynamically adjust the self-cleaning cycle to clean the identified dirty regions (e.g., increase the power supplied to heating elements proximal the dirty regions). In this variant, the adjusted self-cleaning cycle can be stored and subsequently used for the same oven, for the same user, for secondary users (e.g., wherein the self-cleaning cycles or refinements thereof are crowdsourced), or otherwise used.

The camera system 120 (equivalently referred to herein as an imaging system) is preferably integrated into the host system 200, but can alternatively be separate, be removable, or be otherwise configured relative to the host system. The camera system 120 is preferably located within the host system cavity 210, but can alternatively be flush with an inner cavity wall (e.g., wherein the lens forms a substantially contiguous or fluidly sealed surface with the remainder of the inner cavity wall), be recessed behind the inner cavity wall, or otherwise arranged relative to the host system cavity. In one example, the camera system 120 is arranged in the internal cavity ceiling or top. This can function, for instance, to define a field-of-view oriented along a superior-inferior axis of the host system to capture a top-down view (e.g., bird's eye view) of a food item placed in the host system. In some variations and for some food items, this has the benefit of imaging an optimal (e.g., large, maximum, exposed to the highest heat, etc.) surface of the food item, thereby improving the accuracy of one or more processing steps (e.g., prediction of "doneness", prediction of time remaining until cooked, etc.). The camera system 120 is preferably exposed to the high cavity temperatures during high-heat operation, but can be otherwise configured. The host system can include a single camera system, multiple camera systems of the same or different type (e.g., sensitive to the same or different wavelengths, resolutions, fields of view, etc.), or any other suitable set of optical systems.

In preferred variations, the camera system 120 is modular, such that the camera system 120 can be integrated within a variety of host systems (e.g., different oven systems, an oven system and a grill system, all host systems, all of a single type of host system, all of a single model of host system, etc.). This can additionally function to enable replacement or repair of a camera system without significant disturbance to the surrounding host system. In a specific embodiment of this, for instance, the camera system is configured to be placed (e.g., secured, fastened, etc.) within a superior cavity of a host system, such that insertion and/or removal of the camera system requires only minor alterations to the host system (e.g., removal of a panel, minor rewiring, no rewiring, etc.).

In some embodiments, the modular camera system is removable (e.g., between uses of the host system, between operation modes of the host system, in the event of a dangerous condition, in the event that the temperature of the host system exceeds a predetermined threshold, etc.). In a specific example of this, for instance, the camera system can be removed during or prior to certain operation modes (e.g., self-cleaning cycle, modes requiring temperatures potentially damaging to the camera system, etc.). This can additionally or alternatively function to enable easy replacement of the camera system without needing to replace and/or modify the host system (e.g., in the event the camera is damaged, if a light emitter burns out, if a power source of the camera system is depleted, to compensate for a component of the camera system having a shorter shelf life than the rest of the host system, etc.). As described below, this can be enabled by a tray system coupled to the camera system, a platform (e.g., moving platform, motorized platform, etc.), or any other suitable system. In a specific example, for instance, in response to receiving an input from the user selecting a self-cleaning operation mode, the camera system can be removed from the oven host system through a removal system.

In some embodiments, the modular camera system is self-contained (e.g., within an enclosed housing, without exposed wires, etc.).

Figure 2:
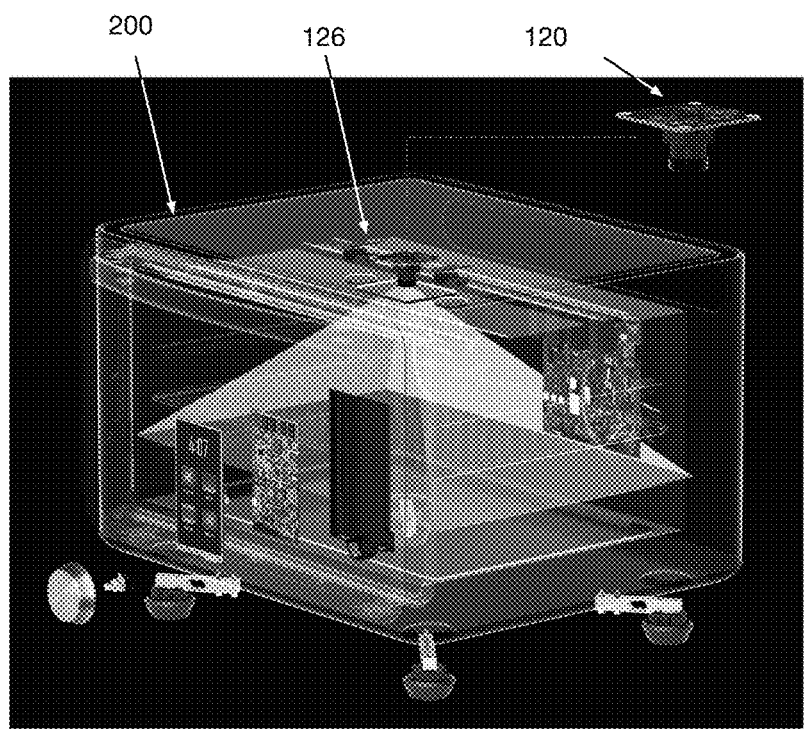
FIG. 2 is an exploded example of the host system with an in-situ camera system.
Figure 3:
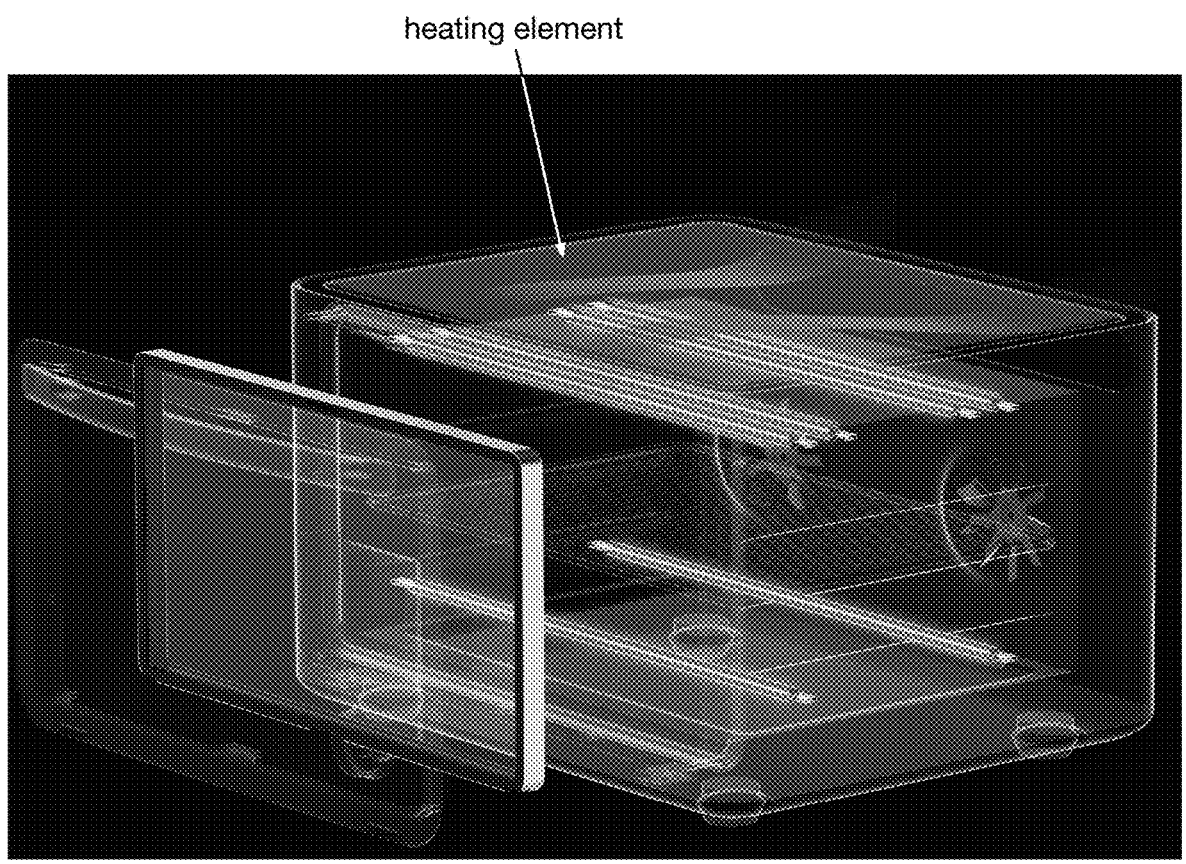
FIG. 3 is an exploded example of the host system with heating elements.

The camera system 120 preferably includes: an optical sensor 122, a lens 124, and a set of light emitters 126, but can alternatively or additionally include: heat sinks 128 (e.g., thermally connected to the optical sensor, the lens, the light emitters, etc.), secondary sensors, an electronics subsystem, or any suitable component (example shown in FIG. 2).

The optical sensor 122 functions to sample the image. Examples of the optical sensor 122 include: a CCD sensor, a CMOS sensor, or any other suitable optical system.

In preferred variations, a set of one or more optical sensors 122 are configured to define a field of view (e.g., top-down view) which can capture a superior surface of a food item placed in the host system. In some embodiments, for instance, the set of optical sensors 122 are arranged in or on a top surface (e.g., ceiling, lid, etc.) of a cavity of a host system. Additionally or alternatively, one or more optical sensors 122 can be arranged on any suitable surface (e.g., interior side wall surface, door, bottom, internal surface, external surface, etc.) of a host system, defining any suitable field of view (e.g., bottom-up view, side view, angled view, etc.).

The light emitters 126 function to illuminate the host system cavity 210. The light emitters 126 are preferably arranged adjacent the optical sensor 122 (e.g., within a predetermined distance from the optical sensor, on the same internal wall of the host system cavity as the optical sensor, etc.), but can alternatively be arranged distal the optical sensor 122 (e.g., on a different internal wall from the optical sensor; directed perpendicular the optical sensor's FOV, etc.), or be otherwise arranged. Examples of the light emitters 126 include: LEDs (e.g., white light LEDs, colored light LEDs, IR LEDs, etc.), OLEDs, incandescent lights, or any suitable set of light-emitting elements.

The lens 124 functions to concentrate light rays on the optical sensor 122. The lens 124 can be a single convex lens (e.g., fisheye lens), a lens array, a set of overlapping lenses (e.g., stacked lenses, set of lenses separated by air, set of lenses separated by a vacuum, etc.), or be any suitable set of lenses. The lens 124 is preferably arranged between the optical sensor 122 and the host system cavity 210, but can be arranged in any suitable location. The lens 124 is preferably mounted to the optical sensor 122 and/or housing for the optical sensor 122, but can alternatively be mounted to the cavity wall (e.g., inner wall of the host system cavity), or to any suitable component. The lens 124 preferably extends across the active face of the optical sensor 122, but can additionally or alternatively extend across the light emitter(s) 126, along the entirety of the inner cavity wall, or extend along any other suitable cavity portion. The lens 124 is preferably made from heat-resistant glass, but can alternatively or additionally be made from heat-resistant thermoplastic (e.g., polycarbonate) or any other suitable material. Examples of the lens material include: borosilicate glass (e.g., Borofloat; 3 mm, 5 mm, or thicker); zinc selenide (e.g., 3 mm, 5 mm, or thicker); germanium (e.g., 3 mm, 5 mm, or thicker); or any other suitable material.

Figure 16A:
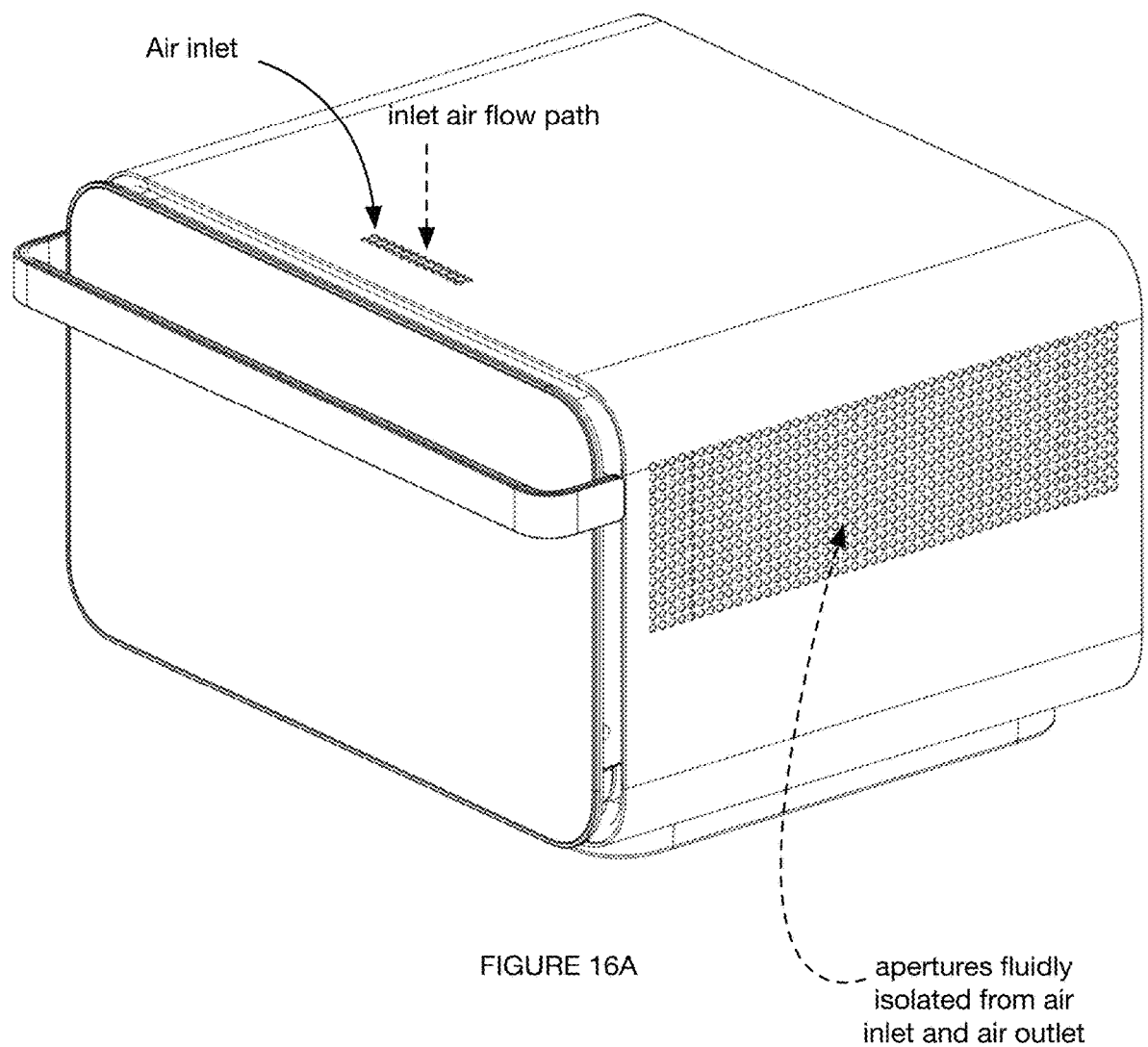
FIGS. 16A-16F are schematic representations of a second example of an oven host system, including: an isometric view of the assembled oven, an isometric view of the oven with the top and sides removed, a cross-sectional view, an elevation view of the assembled oven, and an elevation view with the top and sides removed.
Figure 16B:
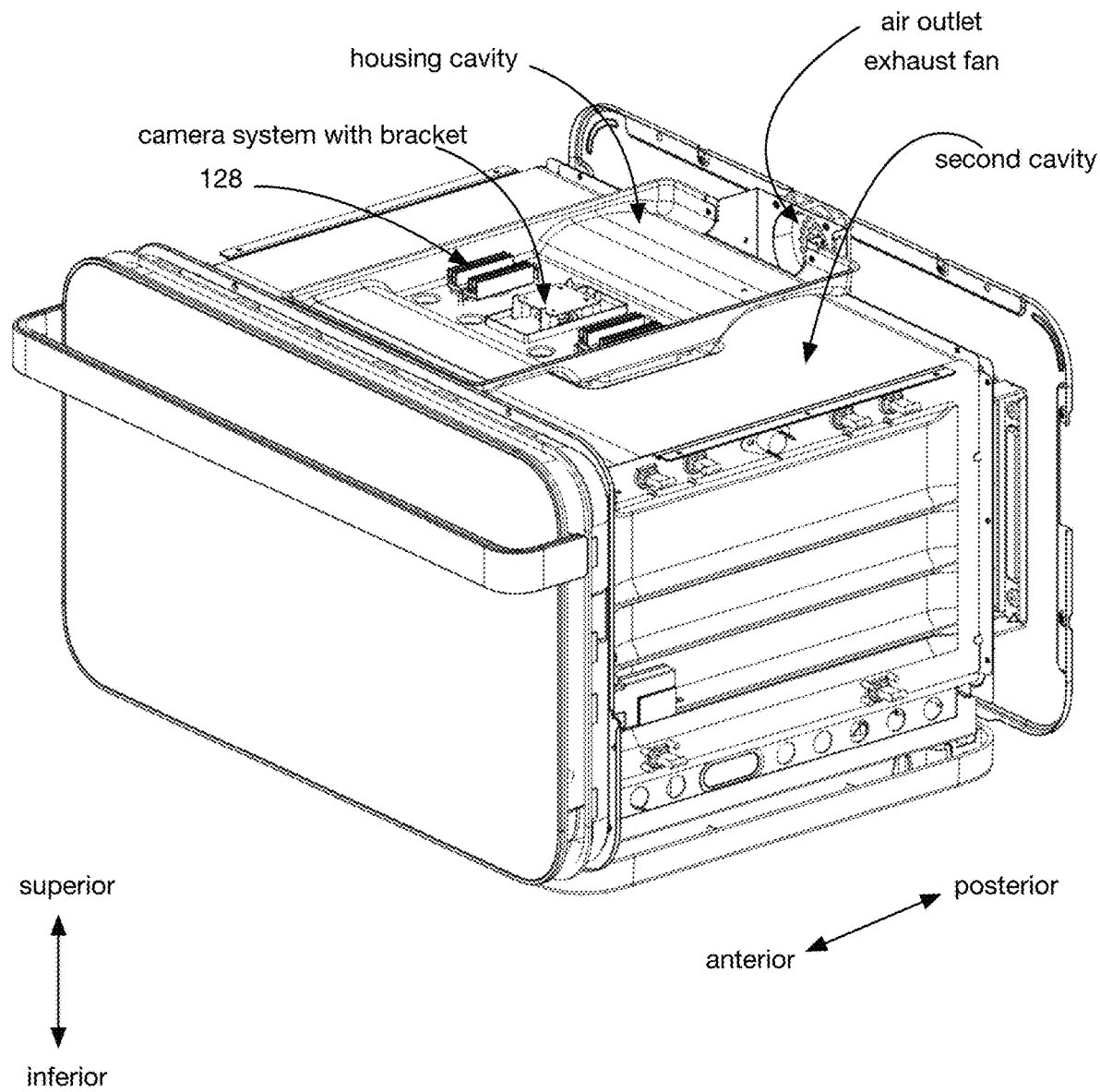
Figures 16C, 16D:
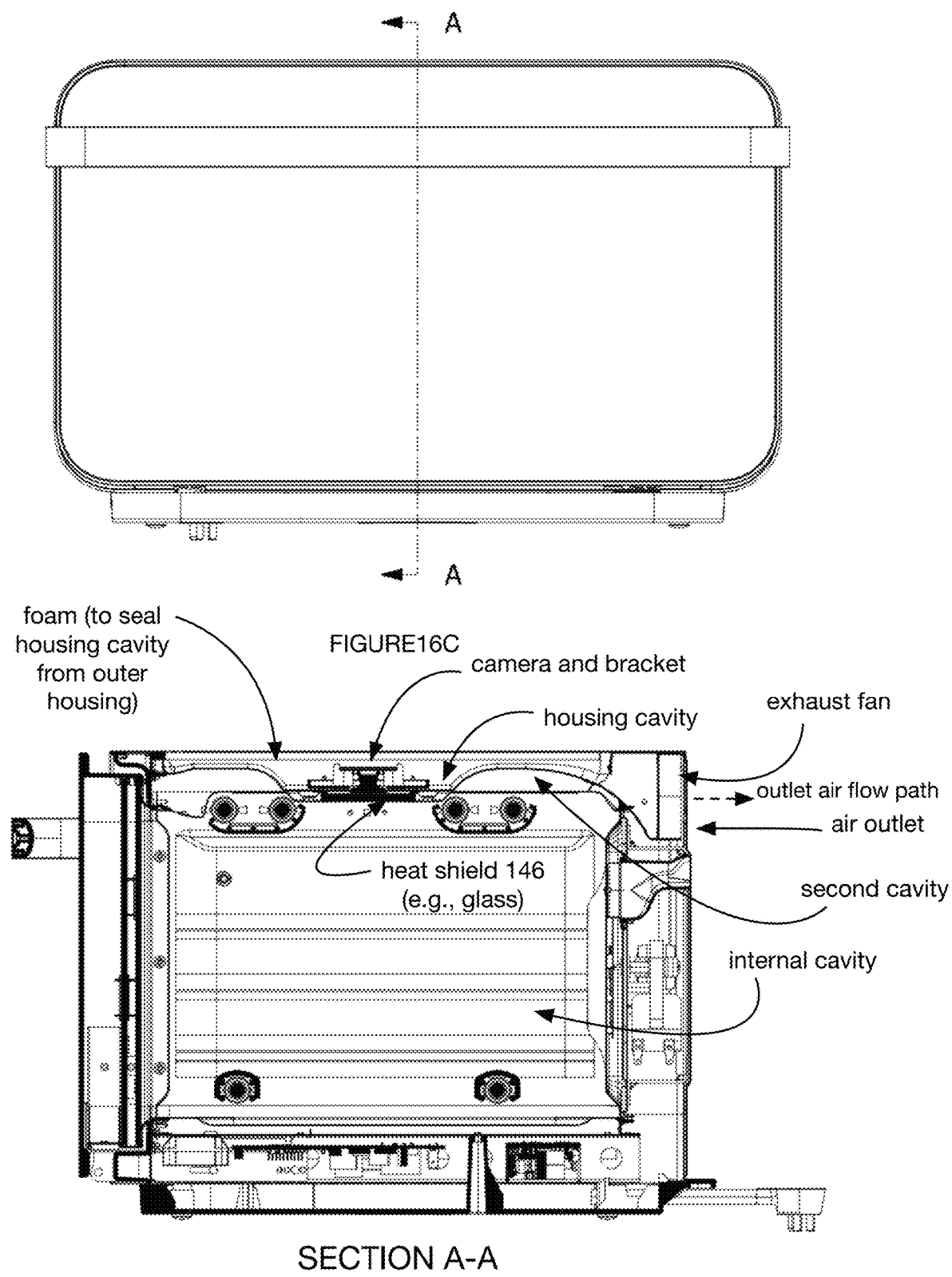
Figure 16E:
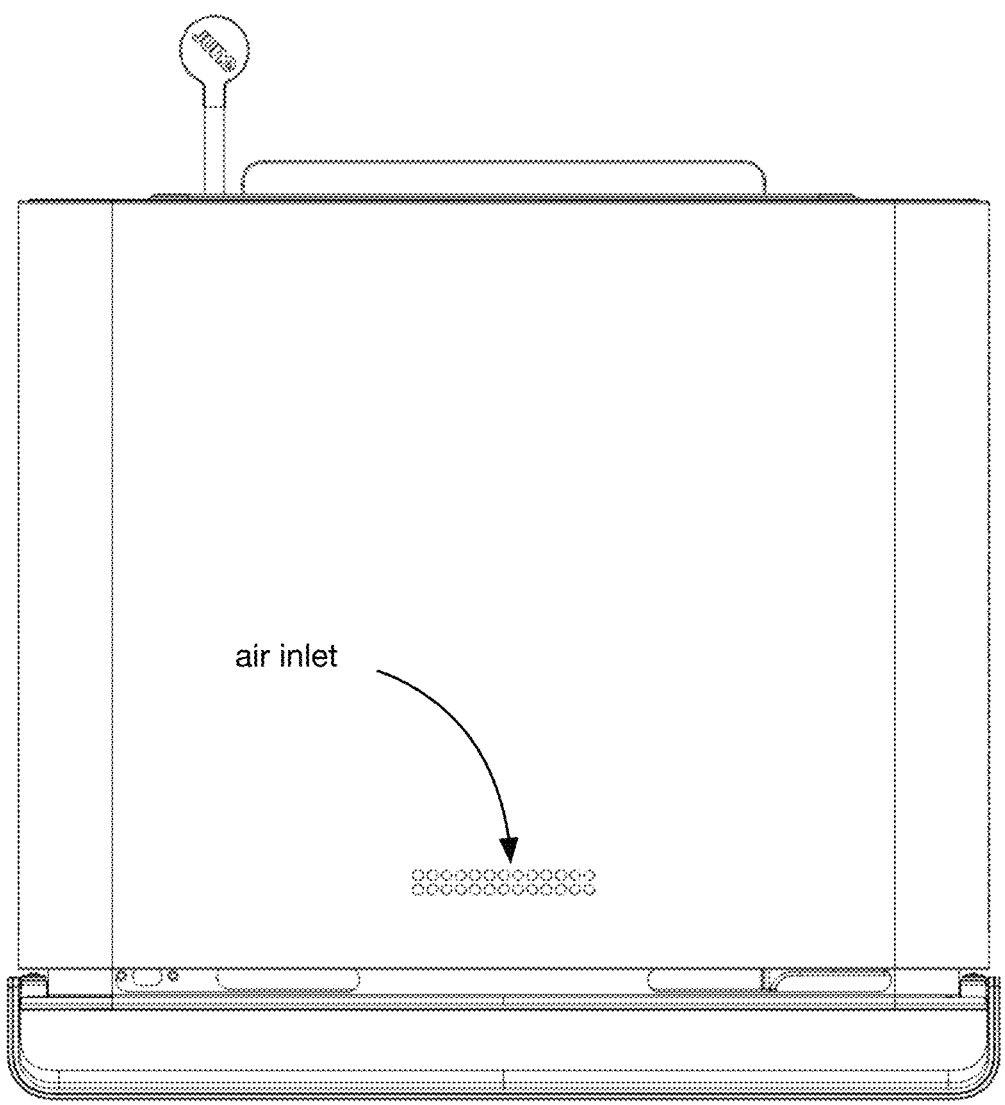
Figure 16F:
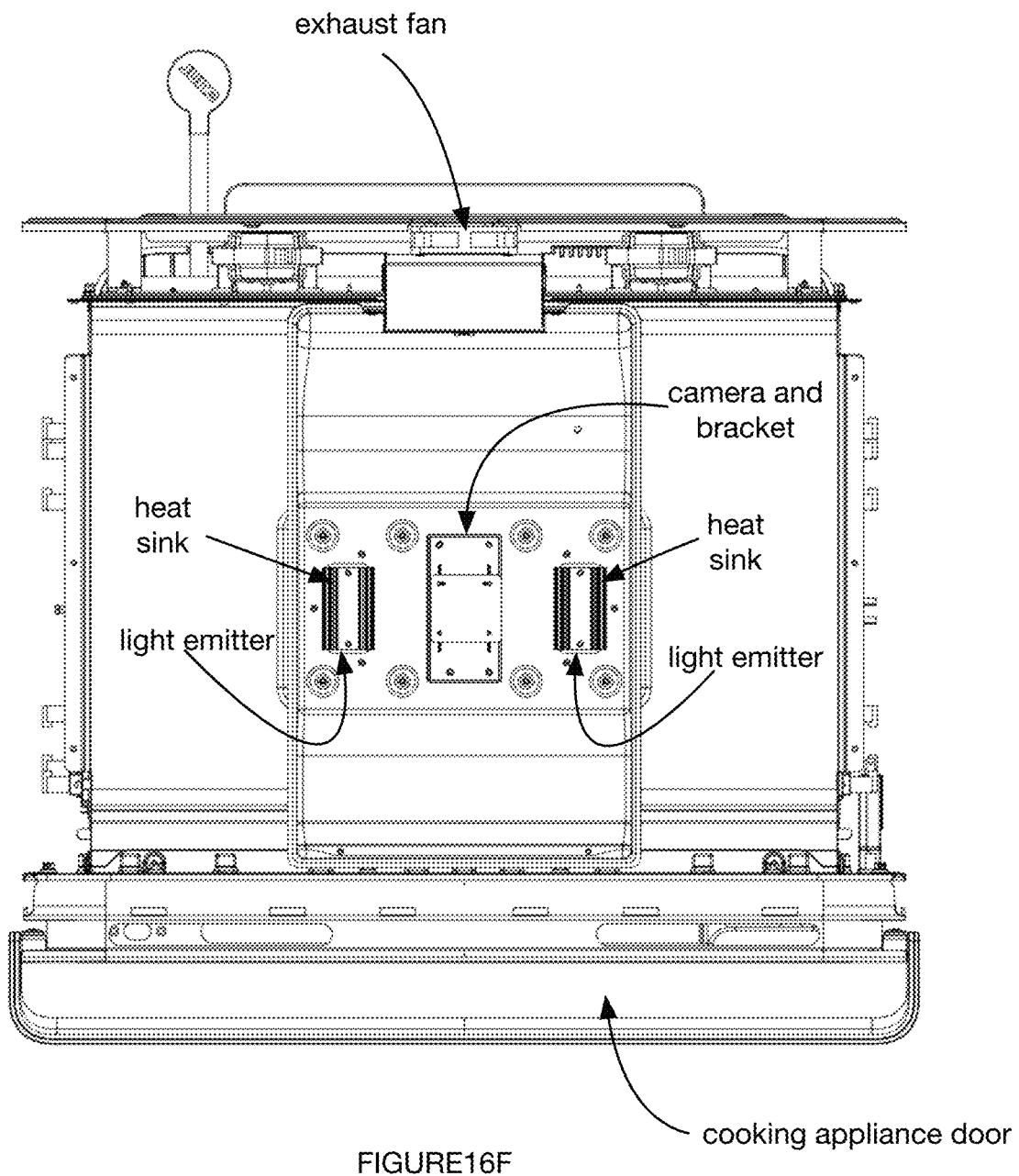
Figure 17:
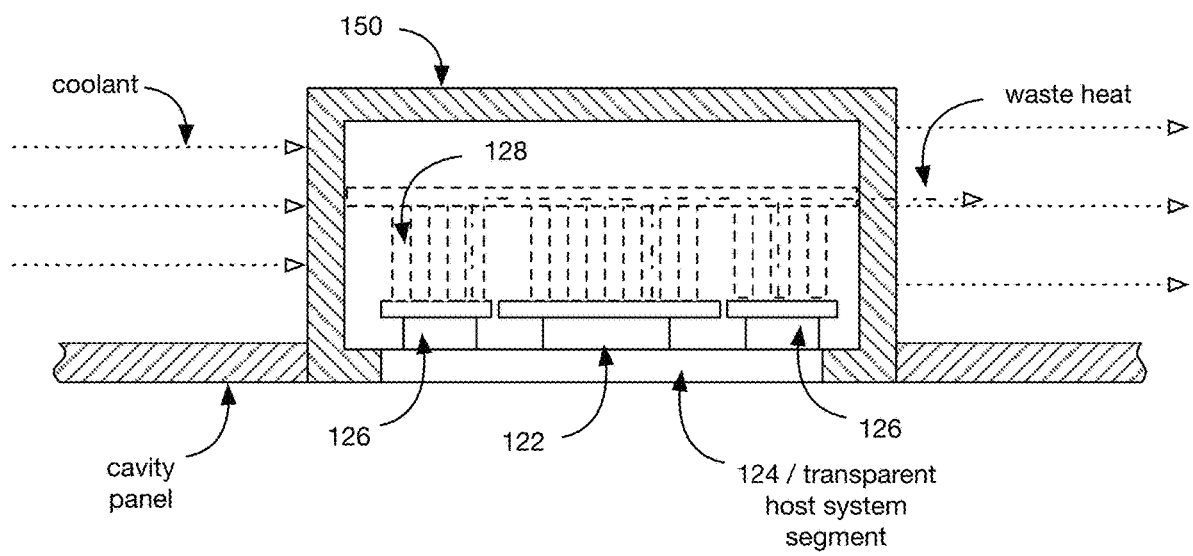
FIG. 17 is an example of a modular camera system installed into a host system.

The camera system can additionally include one or more heat sinks 128 (e.g., fins, channels, etc.), which can function to dissipate overall heat from the camera system, dissipate heat from a particular component of the camera system (e.g., light emitters, electronics subsystem, etc.), direct heat transfer within the camera system (e.g., toward a heat sink housing), or perform any other suitable function. In a set of embodiments (e.g., as shown in FIG. 16F), a heat sink 128 is arranged proximal to (e.g., partially surrounds, fully surrounds, etc.) each of the light emitters and/or cameras. In modular variants, the camera system can include heat sinks within the enclosure and/or heat pipes thermally connecting the camera components (e.g., sensor, processor, etc.) to the enclosure walls, and can optionally include heat sinks (or other heat dispersion features) along the exterior of the enclosure walls.

The camera system can additionally or alternatively include one or more secondary sensors, which can function to inform one or more host system parameters (e.g., cooking parameters such as temperature and/or duration), inform one or more host system operation modes, determine one or more notifications to send to a user (e.g., text message indication indicating that the cooking is complete, a phone call to alert a user in an emergency setting, etc.), initiate a trigger (e.g., motorized removal of a camera system from a host system cavity), or perform any other suitable function. The set of one or more secondary sensors can include any or all of: audio sensors, temperature sensors, volatile compound sensors, weight sensors, humidity sensors, depth sensors, location sensors, inertial sensors (e.g., accelerators, gyroscope, magnetometer, etc.), impedance sensors (e.g., to measure bio-impedance of foodstuff), hygrometers, insertion temperature sensors (e.g., probes), cooking cavity temperature sensors, timers, gas analyzers, pressure sensors, flow sensors, door sensors (e.g., a switch coupled to the door, etc.), power sensors (e.g., Hall effect sensors), or any other suitable sensor.

Further additionally or alternatively, the camera system can include an electronics subsystem, which can function to: power one or more elements (e.g., light emitters) of the camera system, integrate with an electronics subsystem of the host system, enable the camera system to be self-contained (e.g., self-powered, fully removable, enclosed within a housing, etc.), or perform any other suitable function. The electronics subsystem can include any or all of: a power source (e.g., battery, rechargeable battery, charging port, etc.), processing system (e.g., processor, microprocessor, system on a chip, etc.), wireless communication system (e.g., Bluetooth chip, WiFi chip, etc.), or any other suitable component. The electronics subsystem is preferably coupled to the optical sensor and the light emitters, but can additionally or alternatively be coupled to a subset of these components, neither of these components, one or more secondary sensors, or any other suitable components.

In some variations, the system additionally includes one or more remote devices 134 (equivalently referred to herein as user devices or mobile devices), which can function to receive an input from one or more users, transmit an output to one or more users, inform (e.g., trigger) a cooking parameter and/or operation mode of the host system, process one or more images sampled by the optical sensor, or perform any other suitable function. The inputs can include any or all of: food parameters (e.g., food type, size, weight, age, etc.), cooking parameters (e.g., desired doneness, cooking time, cooking temperature, time until ready, etc.), host system operation modes, optical sensor parameters (e.g., field of view, zoom, frame rate, etc.), secondary sensor parameters, or any other suitable input(s). In addition to the types of inputs described above, the outputs can further include any or all of: notifications (e.g., indicating that food is done, indicating an operation mode of the host system, indicating a cooking parameter, indicating a food parameter, etc.), alerts, alarms, timers, a set of images captured by the optical sensor (e.g., time lapse series of images, video of images, etc.) or any other suitable outputs.

The remote device 134 can be a mobile device (e.g., a laptop, tablet, phone, smartwatch, etc.), substantially static device (e.g., desktop, television), a remote server system, or be any other suitable device. The remote device 134 can include user output (e.g., display, speakers, etc.), user input (e.g., touchscreen, microphone, etc.), communication module (e.g., wireless communication module), or any other suitable component. The remote device 134 can be associated with a user device identifier, user account, or any other suitable identifier for the user device itself or the user associated with the user device. The remote device 134 can be indirectly connected to the host system and/or camera system (e.g., through a wireless communication system of the electronics subsystem), directly connected to the host system and/or camera system, or otherwise connected. In some variations, the remote device 134 can communicate with the host system (e.g., a display of the host system, a display mounted to a door of an oven host system, etc.) and/or camera system through an application executed by the remote device, such as a native application, browser application, part of the operating system, or any other suitable application. The application can have access to user device information (e.g., location, proximity, user account information, user device identifiers, calendars, social networking systems, etc.), beacon information, or any other suitable information.

The camera system can additionally or alternatively include any other suitable components.

In one variation, the camera system includes an optical sensor arranged in the center of the top surface defining a cavity of an oven host system, wherein the optical sensor defines a top-down field of view to capture images of a top surface of a food item placed in the cavity. The camera system further includes a fisheye lens arranged inferior to the optical sensor, as well as a set of light emitters arranged in the same top surface, proximal to (e.g., circumferentially surrounding, on either side of, at an offset of less than 10 mm, at an offset of less than 50 mm, etc.) the optical sensor.

2.3 System: Camera Cooling Mechanism.

The camera cooling mechanism 140 functions to cool the camera during host system operation. The camera cooling mechanism 140 is preferably used (e.g., operated) only when the host system operates in one of a set of predetermined modes (e.g., high-heat operation modes), but can alternatively or additionally be used in all host system operation modes, in a subset of the operation modes, or used at any suitable time. The predetermined modes are preferably modes associated with cavity temperatures (and/or temperatures proximal the camera system) exceeding a threshold temperature, but can alternatively or additionally be modes associated with prolonged high temperature camera system exposure, modes associated with minimal or no camera use, or any suitable mode. The other operation modes can include modes associated with secondary temperatures lower than the threshold temperature; modes associated with cavity steam or other gaseous colloid; modes involving etchants or caustic materials; or any suitable operation mode. The threshold temperature can be: a predetermined temperature (e.g., 500° F., 600° F., 700° F., 800° F., 900° F., etc.), the lens melting temperature, an upper operating temperature for the camera system (e.g., a degradation temperature; a temperature received from the manufacturer; etc.), an upper operating temperature for the light emitters, or any suitable temperature.

Examples of the predetermined modes include: the self-cleaning mode, the broiling mode (e.g., top broiling, bottom broiling), a heating mode corresponding to a temperature above a predetermined threshold, or any suitable mode. In a specific example, the camera cooling mechanism can be selectively operated when the broiling step (or other step involving temperatures lower than the threshold temperature) is longer than a threshold duration, and not operated when the broiling step is shorter than the threshold duration. The threshold duration can be determined using a timer, determined from the operating instructions or recipe, or otherwise determined. The camera cooling mechanism can be used continuously after the operation conditions are met, intermittently (e.g., as needed, based on cavity sensor feedback), or at any suitable time. However, the camera cooling mechanism can be operated at any suitable time.

The camera cooling mechanism 140 is preferably operated and/or implemented independently of camera system operation (e.g., the camera cooling mechanism can be used when the camera system is not used), but can alternatively always be used during the camera system operation, be used in a subset of camera system operation modes, be interspersed with camera system operation (e.g., wherein the alternates between camera system operation and camera cooling mechanism operation), or be otherwise used.

The system 100 can include one or more camera cooling mechanisms 140, wherein each camera cooling mechanism 140 can cool a single camera system 120 or multiple camera systems 120. For example, when the host system 200 includes multiple camera systems 120, the camera systems 120 preferably share a common camera cooling mechanism 140, but can alternatively have individually operated camera cooling mechanisms 140.

However, a given camera cooling mechanism 140 can be otherwise shared between individual camera systems 120. Different camera cooling mechanisms 140 can optionally be used for different host system operation modes, in overlapping host system operation modes (e.g., wherein two camera cooling mechanisms are cooperatively used to cool the camera system in a single operation mode), or otherwise used.

In some variations, a set of one or more camera cooling mechanisms 140 are implemented (e.g., integrated into the camera system and/or host system) and/or operated (e.g., switched between operation modes) such that the set of camera cooling mechanisms 140 address each of a set of heat sources (e.g., host system heat source, heat generated by camera and/or other electronic components) and/or heat transfer types (e.g., convection, conduction, radiation). In a specific example, for instance, a first camera cooling mechanism 140 is implemented to address heat originating from the heat source of the host system 200 (e.g., resistive heating coil, calrod, coals, flame, etc.) and a second camera cooling mechanism 140 is implemented to address heat originating from the camera itself. In another heating example, a first camera cooling mechanism 140 (e.g., infrared coating) can be implemented to address a first type of heat transfer (e.g., radiation) and a second camera cooling mechanism 140 (e.g., circulating coolant fluid) can be implemented to address a second type of heat transfer (e.g., conduction). Additionally, any number of other cooling mechanisms 140 can be implemented, such as a third cooling mechanism 140 (e.g., fan) implemented to address a third type of heat transfer (e.g., convection). Alternatively, a single cooling mechanism 140 can address multiple heat sources and/or types of heat transfer occurring between the host system and the camera system, within the camera system, between the host system and the ambient environment, between the camera system and the ambient environment, or elsewhere.

In some variations, the camera cooling mechanism is at least partially distributed among the camera system and the host system. In examples of this variation, for instance, a cooling mechanism of the host system (e.g., ventilation holes, cooling channels, etc.) is used in conjunction with a cooling mechanism (e.g., modular cooling mechanism) of the camera system. In a specific example, a cooling mechanism of the camera system in the form of a heat sink housing enclosing the camera system is integrated within (e.g., secured to, placed within, fluidly connected to, etc.) a cooling channel (e.g., vent, duct, lumen, etc.) or internal cavity (e.g., duct, manifold, etc.) of the host system. Additionally or alternatively, the camera cooling mechanism can be fluidly coupled to one or more apertures of the host system (e.g., ventilation holes, air intake holes, air exhaust holes, etc.); an active cooling mechanism of the host system (e.g., motorized fan, exhaust fan, impingement mechanism, pumped coolant mechanism, etc.); a passive cooling mechanism of the host system (e.g., coolant mechanism, heat shield, radiative coating, etc.); and/or any other suitable cooling mechanism of the host system.

In alternative variations, the camera cooling mechanism is fully integrated within the host system or within a cooling mechanism of the camera system. In a first specific example, for instance, the camera cooling mechanism can include a modular camera system with a cooling mechanism 140 fully integrated (e.g., enclosed) within a housing of the camera system. In a second specific example, the camera system is installed into a host system which cools the camera system by a camera cooling system integrated within the host system and arranged proximal to an installation site of the camera system.

The camera cooling mechanism 140 preferably includes a single pass cooling system (e.g., once-through cooling system), but can additionally or alternatively include a recirculation system (e.g., open recirculation system, closed recirculation system, etc.) or any suitable cooling system. The camera cooling system is preferably a non-contact cooling system, but can alternatively be a contact cooling system. The camera cooling mechanism can include one or more active cooling systems, one or more passive cooling systems, or a combination of both.

2.4 System: Camera Cooling Mechanism—Passive Cooling Mechanism.

The camera cooling mechanism can include one or more passive cooling mechanisms. Each passive cooling mechanism can cool the camera system using: thermal isolation, thermal insulation, conduction, convection, or any other suitable cooling mechanism.

In some variations, the camera cooling mechanism includes a set of coolant manifolds, which can function to circulate a coolant (e.g., fluid, gas, two-phase coolant, water, air, heat-transfer fluid, etc.) proximal to the camera system. The camera systems' coolant manifolds (e.g., cooling channels, cavities, etc.) can be fluidly connected in series, in parallel, or in a combination of both series and parallel.

In some variations, the camera cooling mechanism includes a set of one or more air knife generators, which functions to direct pressurized air parallel the camera systems' lens(es).

In some variations, the passive camera cooling mechanism includes a set of one or more heat sinks 128. The heat sink 128 can be thermally connected to: a cooling channel with coolant flowing therein, a channel exposed to the ambient environment and/or a host system cavity (e.g., first internal cavity, second internal cavity, etc.), the camera system (e.g., as described in the heat sinks of the camera system above), a cavity of a housing of the camera system (e.g., as described below), the ambient environment, or any suitable thermal sink.

In preferred variations, the passive camera cooling mechanism includes an enclosure 150 (equivalently referred to as a housing) configured to enclose one or more elements of the camera system. The enclosure 150 preferably functions as a heat sink (e.g., is made from a conductive material), which can function, for instance, to dissipate heat generated by the camera system itself, as well as any other suitable heat sources (e.g., electronics of the host system, heat from a host system cavity, heat from a heat source of the host system, etc.). Additionally or alternatively, the enclosure can have any other suitable function (e.g., hermetically seal the camera system from a host system cavity such as an internal cavity, hermetically seal the camera system from the ambient environment, etc.).

The enclosure preferably includes one or more thermally conductive materials (e.g., metal, steel, aluminum, material having a thermal conductivity greater than 50 Watts per meter-Kelvin [W/(m*K)], greater than 300 W/(m*K), etc.), which function to receive heat generated by the camera system. Additionally or alternatively, the enclosure can include one or more electrically conductive materials, insulative materials, or any other suitable materials. In one embodiment, the enclosure is made from sheets of metal configured to isolate the camera system from a cavity of the host system (e.g., first internal cavity, second internal cavity, first and second internal cavities, etc.). The enclosure can be in the form of a full or partial box, spherical housing, aerated housing including a set of apertures, or any other suitable housing.

In some variations, the enclosure is hermetically sealed, which can function to prevent ingress of one or more particles from a host system cavity (e.g., ash, food particles, smoke, etc.), prevent ingress of hot air from a host system cavity (e.g., internal cavity, etc.), prevent ingress of air or particles from the ambient environment, or otherwise maintain a separation between the camera system and any cavities or regions of the host system. Alternatively, the enclosure can be partially sealed, open, or otherwise configured.

In some variations, the passive cooling mechanism includes a heat shield 146, which functions to partially or fully minimize heat transfer (e.g., convective heat transfer, conductive heat transfer, radiative heat transfer, etc.) between any or all of the camera system and a heat source (e.g., an internal cavity of a host system, a conductive element of the host system, heating coil, etc.).

The heat shield 146 is preferably transparent or at least partially transparent (e.g., to provide an unobstructed view of an internal cavity to the lens, to provide a partially unobstructed view of an internal cavity to the lens, etc.) and statically mounted relative to the lens (e.g., adjacent to the lens, proximal to the lens, in contact with the lens, at an offset from the lens, at an offset of less than 10 mm from the lens, at an offset of less than 50 mm from the lens, at an offset of greater than 50 mm from the lens, at an offset configured to permit a vacuum gap between a lens and the heat shield, etc.), but can alternatively be actuatably mounted relative to the lens (e.g., moved into place before the predetermined host system operation modes begin). In the latter case, the heat shield can have any suitable optical property (e.g., be opaque, translucent, etc.), and can be made from thermally insulative material (e.g., thermal insulation), thermally conductive material (e.g., metal), or any suitable material. In preferred variations, the heat shield is at least partially composed of glass, but can additionally or alternatively be composed of a polymeric material (e.g., plastic, acrylic, etc.), a metallic material, or any other suitable material.

The heat shield 146 further preferably includes a coating on one or more surfaces of the heat shield 146, which functions to minimize or eliminate one or more forms of heat transfer from occurring between a heat source (e.g., internal cavity, heating element of host system, etc.) of the host system and the camera system. The coating is preferably arranged on (e.g., placed, secured to, sprayed on, painted on, etc.) a broad surface of the heat shield closest to the heat source (e.g., an inferior broad surface), but can additionally or alternatively be arranged on any suitable surface (e.g., superior broad surface, edge surface, bridging surface between two or more broad surface, or any other suitable surface), incorporated into the heat shield (e.g., dispersed throughout, arranged as a layered sheet within the heat shield, etc.), or otherwise arranged. In preferred embodiments, the heat shield includes a coating (e.g., infrared [IR] coating, IR topcoat, ultraviolet [UV] coating, UV topcoat, gamma ray coating, etc.) configured to minimize and/or block radiative heat transfer between a heat source and the camera system. In a specific example, for instance, the heat shield 146 includes an IR topcoat applied to (e.g., sprayed on, painted on, etc.) an inferior surface of a glass heat shield.

In some embodiments, the heat shield 146 is coupled to (e.g., fixed to, secured to, adhered to, fastened to, etc.) another element of the camera cooling mechanism. In some examples, the heat shield is coupled to a heat sink enclosure, as described above. In a specific example, for instance, the heat shield is secured to an inferior broad surface of the heat sink enclosure such that a lens of the camera system is arranged superior to (e.g., directly over) the heat shield. In this specific example, the host system can include any number of apertures inferior to the heat shield such that the camera has an unobstructed (or mostly unobstructed) view into the host system cavity.

In alternative embodiments, the heat shield 146 is fixed to the oven host system. In a specific example of the system, such as in a system having a modular (e.g., removable, self-contained, replaceable, etc.) camera system, the heat shield 146 can be fixed to the oven host system such that the heat shield is present even in absence of the camera system. In this specific example, a lens of the camera system can be arranged proximal to the heat shield when the camera system is placed in the oven host system, a housing (e.g., heat sink housing) configured to enclose the camera system can include an aperture (e.g., on an inferior broad surface) configured to be placed over the heat shield during camera use (e.g., while camera is taking images, while camera system is secured to an oven host system, etc.), or the camera system can be otherwise arranged relative to the heat shield.

Figure 4:
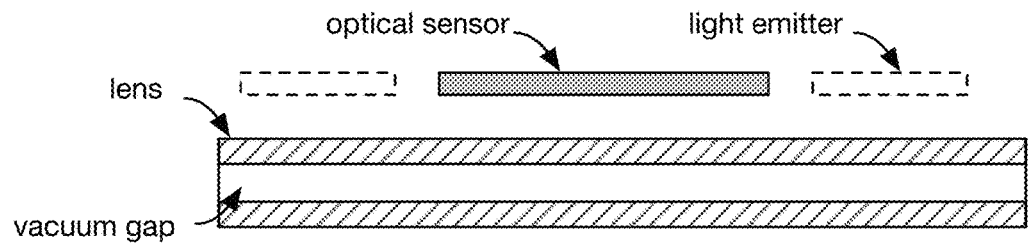
FIG. 4 is a schematic representation of an example of a passive cooling mechanism including a vacuum gap.

In some variations, the passive camera cooling mechanism includes a vacuum gap that thermally isolates the camera system from a cavity (example shown in FIG. 4). The vacuum gap is preferably arranged between the lens and the camera. In this embodiment, the threshold temperature is preferably lower than the lens' phase change temperature (e.g., the lens' melting temperature), such that the lens can maintain the vacuum seal. Additionally or alternatively, one or more vacuum gaps can be arranged between a first lens and a second lens, between a lens and a heat shield (e.g., transparent shield with infrared coating), between the camera system and a cavity (e.g., internal cavity) of the host system, or in any other suitable arrangement. In one example, for instance, the lens and optical sensor can be recessed behind a heat shield, wherein the vacuum gap is defined between the lens and the heat shield.

In some variations, the passive camera cooling mechanism includes thermal insulation arranged between the camera system and a region of the host system (e.g., a host system cavity, a host system housing, etc.). Examples of the insulation include: ceramics, foams, polycarbonate thermal plastic, or any suitable thermal insulation. In some embodiments (e.g., as shown in 16D), foam is arranged between the camera system and a housing panel of the host system. In a specific example, the foam forms a superior surface of the camera system enclosure. In an alternative example, the foam is arranged between a superior surface of the camera system housing and a superior surface of the host system outer housing.

Additionally or alternatively, any suitable insulative material can be arranged in any other suitable location, such as, but not limited to: between the camera system and the camera housing, between the camera housing and an interior surface of the host system (e.g., between an exterior surface of the camera system housing and a surface defining an internal cavity of the host system), within any suitable cavity of the host system, or in any other suitable location.

Figure 5:
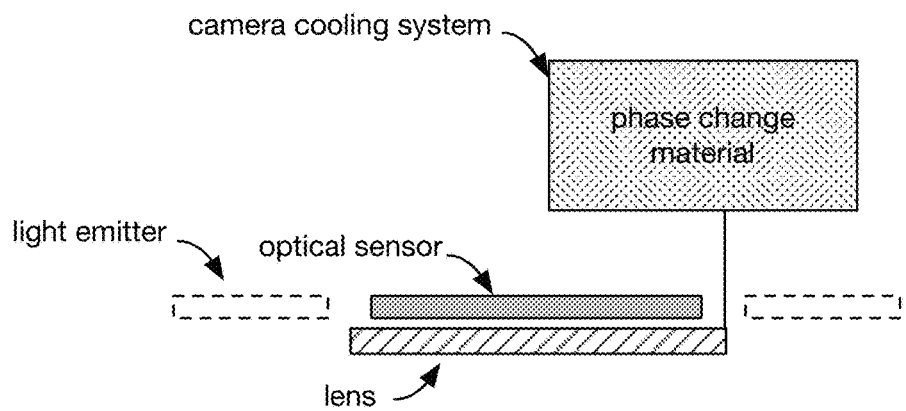
FIG. 5 is a schematic representation of an example of a passive cooling mechanism including a phase change material thermally connected to the camera lens.

In some variations, the passive camera cooling mechanism includes phase change material, which functions to absorb the heat (example shown in FIG. 5). The phase change material can be: coolant, wax, or any suitable material. The phase change material is preferably thermally connected to the camera system component to be cooled (e.g., the lens), either directly (e.g., by being embedded within or contained within the component) or indirectly (e.g., thermally connected to the component via a thermally conductive path, such as a metal bar). The phase change material is preferably arranged within a reservoir, but can be otherwise arranged. In one example, the reservoir is built into the camera system along the lateral space between the optical sensors and light emitters. In this example, the hot lens (heated by the cavity) is directly cooled by the material (contacting the lens) changing phases. In a second example, the reservoir is recessed behind the camera system and is thermally connected to the hot lens by a thermal pipe (e.g., a metal rod). However, the reservoir can be otherwise arranged. The reservoir can optionally be thermally connected to a heat exchanger (e.g., a heat sink open to ambient, the outer cavity wall, a heat pump, etc.), a condenser, or any suitable heat extraction system.

2.5 System: Camera Cooling Mechanism—Active Cooling Mechanism.

In addition to or alternative to the passive cooling mechanisms described above, the system can include one or more active cooling mechanisms. The active cooling mechanism can pump or carry heat away from the camera system, apply lower-temperature coolants to the camera system, or otherwise cool the camera system.

The active cooling mechanism can include: a coolant manifold fluidly connected to the camera system (and/or component thereof), and can optionally include: a coolant source, a coolant sink, one or more nozzles, a heat exchanger or condenser, or any other suitable component.

The coolant is preferably a fluid, more preferably a liquid but alternatively a gas. The coolant can be: a cleaning agent (e.g., that reacts with food soils to facilitate better self-cleaning); the dispersed material for a cooking gaseous colloid (e.g., water for steam); refrigerant; ambient air; compressed gas (e.g., air at 5 PSI; air at 25-30° C., etc.);

phase change material (e.g., water); or any other suitable coolant capable of absorbing heat and flowing to the heat exchanger or a thermal sink.

The coolant manifold can be a pipe separate from the other camera system components (e.g., a thermally conductive pipe, such as a metal pipe), or be defined by one or more camera system components. The coolant manifold is preferably thermally connected to the camera system and thermally isolated or insulated from the host system cavity (e.g., such that the coolant does not cool the host system cavity during operation), but can alternatively be thermally connected to the host system cavity and regulate the cavity temperature. The coolant manifold preferably extends along a shortest path between the camera system and the reservoir, but can alternatively extend along one or more host system walls between the camera system and the reservoir. In the latter case, the host system walls are preferably those not supporting the heating elements used in the high-heat operation modes, but can alternatively be the walls supporting the operating heating elements. The coolant manifold can be located: between the lens and the camera (e.g., wherein the coolant manifold is fluidly sealed or the lens and camera are fluidly sealed); along the lens; through the lens (e.g., wherein the lens is hollow); along, within, or through the camera housing (e.g., within the housing lumen, within the housing walls, etc.); behind the camera system; along a heat shield; through a hollow heat shield; or be otherwise located. In variants where the coolant manifold is defined within a lumen of a hollow lens, the lens preferably has an index of refraction substantially matched to that of the coolant. Alternatively or additionally, the coolant can be refraction index-matched to the lens, or have different optical properties.

The cooling manifold is preferably thermally connected to the camera system and fluidly connected to a coolant source, and can be optionally connected to a coolant sink or heat exchanger. The coolant source can be: a reservoir, a mains line (e.g., waterline), the ambient environment, or any other suitable coolant source. The coolant source is preferably pressurized (e.g., by hydrostatic pressure, a pump, etc.), but can alternatively be gravity-driven or otherwise driven.

The coolant sink can be: the coolant source, a second reservoir, a mains line (e.g., a sewer line), the ambient environment, an expansion tank, a phase change material, or be any other suitable coolant sink. The heat exchanger can be: an air cooled heat exchanger (e.g., located outside the host system), an evaporative heat exchanger, an expansion valve coupled with an evaporator, or be any other suitable heat exchanger. In one example, the heat exchanger can include a thermoelectric device (e.g., Peltier pump) located between the coolant sink and a secondary sink. In a second example, the heat exchanger can include a thermoelectric device located between the camera system (or component thereof) and the coolant sink. However, the system can include any suitable heat exchanger.

Figure 6:
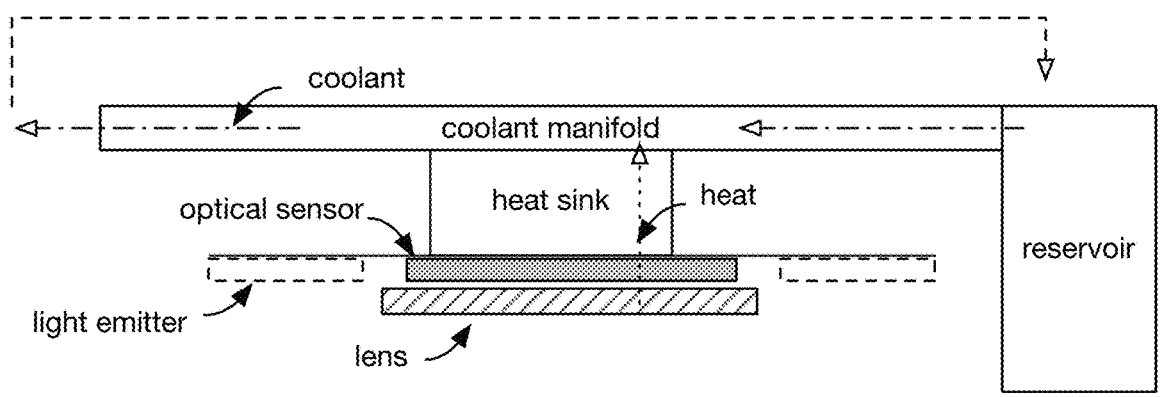
FIG. 6 is a schematic representation of an example of an active cooling mechanism with a separate coolant manifold.
Figure 7:
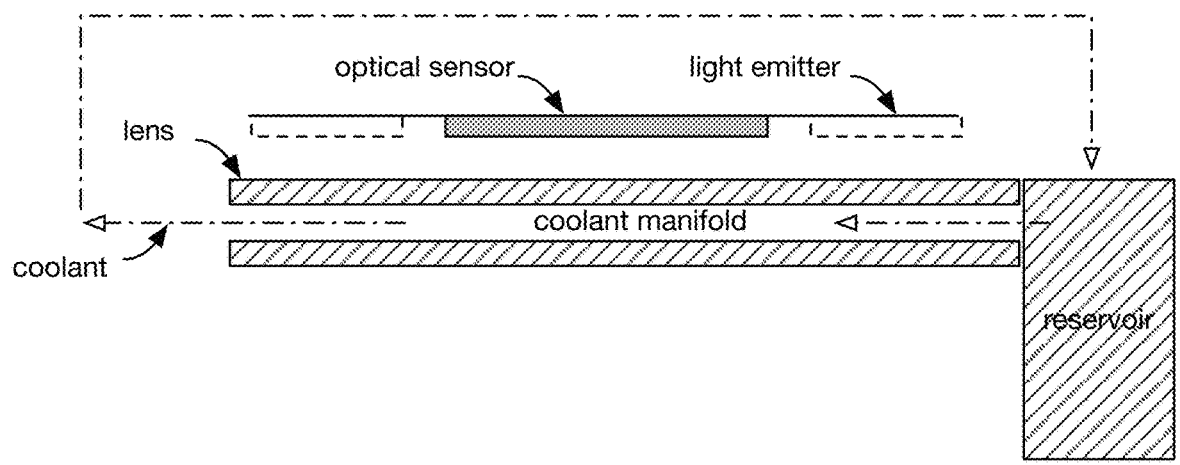
FIG. 7 is a schematic representation of an example of an active cooling mechanism with a coolant manifold defined by the lens.

In some variations, the active cooling mechanism includes a closed-loop cooling system. In this embodiment, the coolant manifold can: extend through the camera housing; be defined by the camera lens (example shown in FIG. 7, wherein the coolant can be refraction-index matched to the lens); be defined between the lens and the optical sensor; flow by a heat sink thermally connected to the camera, emitters, and/or lens (e.g., extend behind the camera system; example shown in FIG. 6); or be otherwise defined. The coolant is preferably water, but can alternatively be refrigerant (e.g., a phase change material), be the dispersed material for a gaseous colloid system (e.g., be the water for a steam injection system) or be any suitable coolant. The coolant source is preferably the waterline, but can alternatively be a reservoir (e.g., the steam reservoir) or be any other suitable coolant source. The coolant sink is preferably the sewer line, but can alternatively be the reservoir, be a secondary reservoir, be the ambient environment (e.g., wherein cooling the camera system evaporates the water, wherein the water vapor can be released to ambient), be an expansion tank, or be any other suitable coolant sink. An optional heat exchanger can be thermally connected to the coolant sink, but can be otherwise thermally connected to the system. However, the water cooling system can be otherwise configured.

Figure 8:
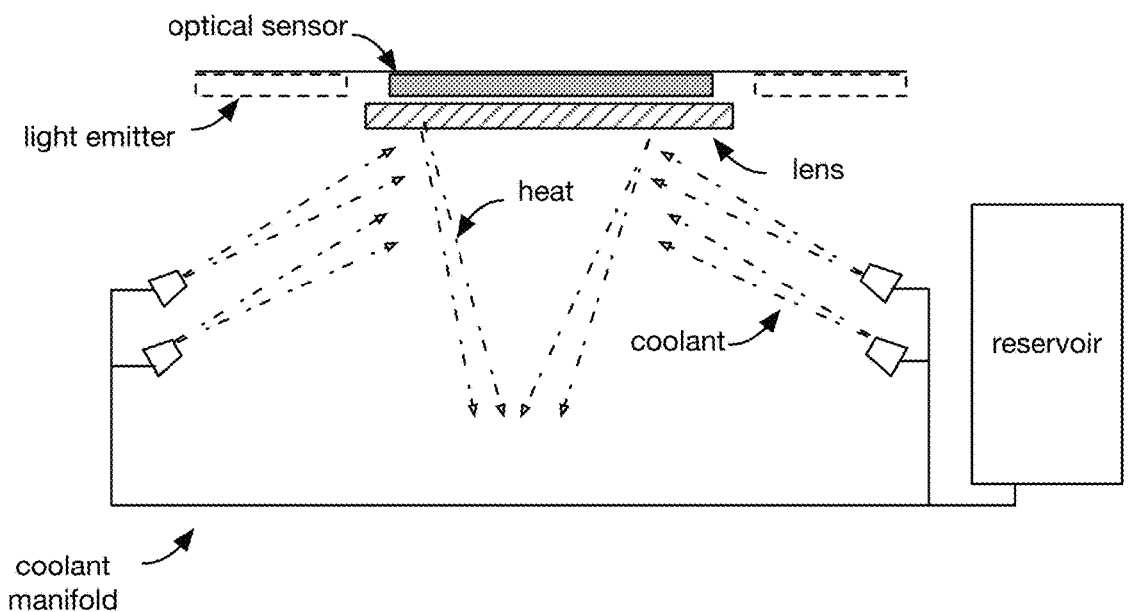
FIG. 8 is a schematic representation of an example of an impingement cooling mechanism.
Figure 9:
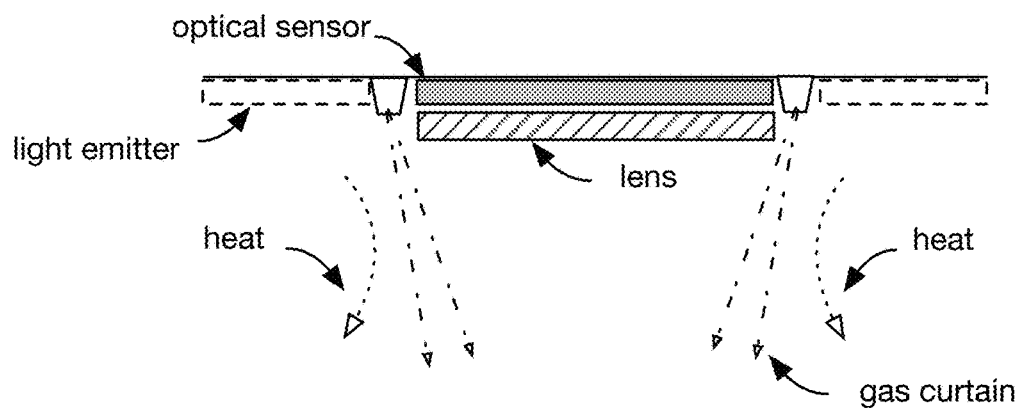
FIG. 9 is a schematic representation of an example of a lens blowout.

In some variations, the active cooling mechanism includes an impingement cooling system. In this embodiment, the active cooling mechanism includes a liquid coolant manifold fluidly connected to a set of nozzles directed at the camera system (example shown in FIG. 8). In operation, the nozzles can spray (e.g., impinge) coolant onto the heated surfaces of the camera system. The nozzles are preferably mounted to or defined within the cavity interior (e.g., along the cavity lumen), but can alternatively be located within the cavity walls (e.g., behind the interior cavity wall), or be otherwise arranged. The nozzles are preferably static, but can alternatively be removable (e.g., manually) or actuatable (e.g., by motors attached to the nozzles). The nozzles can double as nozzles for a second host system component (e.g., the steam injector), but can alternatively be used for camera cooling only. The nozzles are preferably directed at the cavity-facing side of the camera system, but can alternatively be directed at the front of the camera lens, directed at the back of the camera lens, or be otherwise arranged. In this embodiment, the coolant is preferably food-safe, but can alternatively be selected to burn off at the host system operating temperatures, or be otherwise selected. Examples of coolant that can be used include: water, vinegar, a baking soda solution, oven cleaner solutions, or any other suitable coolant. The impingement system can optionally use multiple coolants, wherein different coolants are selected for different host operation modes. For example, oven cleaner can be selected for an oven's self-cleaning mode, while water can be selected for high-temperature steaming modes (e.g., wherein the hot lens evaporates the impinging water to create steam). In the latter case, the frequency and volume of the sprayed water can be determined based on the desired cavity humidity. Alternatively, the cavity humidity can be dynamically adjusted to accommodate for the additional steam generated by the evaporated water.

In some variations, the active cooling mechanism includes a gaseous cooling mechanism. In a first variation of the third embodiment, the gaseous cooling mechanism includes a lens blowout that blows air out and away from the lens (and/or camera system components), into the cavity. The lens blowout preferably includes an annular outlet defined about the lens (or outlet having substantially the same geometry as the lens or camera system), wherein the outlet is fluidly connected to a gaseous coolant source (e.g., ambient air). The outlet is preferably angled radially inward to form a conical coolant curtain within the cavity (example shown in FIG. 19), but can alternatively be oriented normal the lens plane, angled radially outward, or otherwise arranged. The outlet can be configured to form laminar coolant flow, turbulent coolant flow, or any other suitable fluid flow. The gaseous coolant is preferably pressurized (e.g., at the coolant source, by a pump), but can be unpressurized (e.g., at atmosphere). The gaseous coolant pressure can be higher than 5 psi, 10 psi, 100 psi, 1,000 psi, or any suitable pressure.

Figure 10:
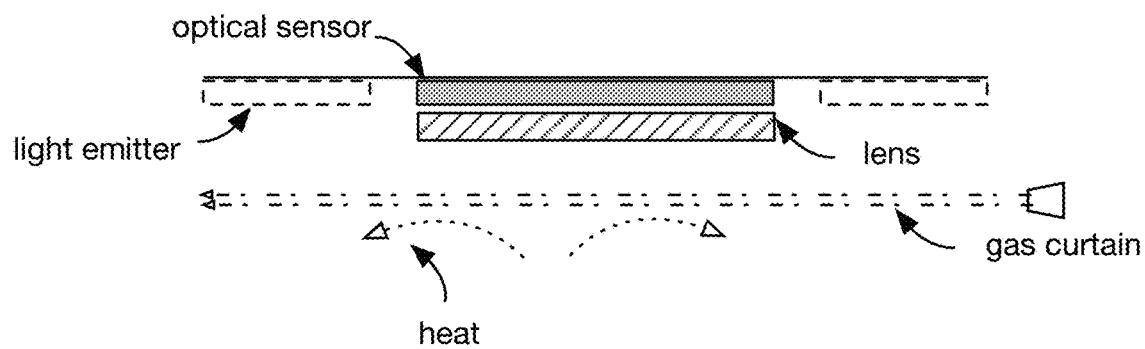
FIG. 10 is a schematic representation of an example of an air knife.

In some embodiments, the gaseous cooling mechanism includes an air knife that blows air across the lens (example shown in FIG. 10). The air can push hot air away from the camera system and/or form an air curtain in front of the lens. The air is preferably directed perpendicular the lens plane or perpendicular the optical sensor plane, but can alternatively be angled upward (e.g., toward the lens), downward (e.g., away from the plane), or otherwise oriented. The wall opposing the air source preferably includes baffles that direct impinging air away from the camera system (e.g., directs the air downward), but can alternatively be featureless or have any other suitable feature. The air preferably has laminar flow, but can alternatively have turbulent flow or any other suitable flow pattern. The air preferably exhausts into the cavity (e.g., impinges upon the opposing cavity wall and is redirected into the cavity), but can alternatively be blown into an external vent (e.g., arranged on the opposing cavity wall), or otherwise exhausted. However, the camera cooling mechanism can include any suitable gaseous cooling mechanism.

In some variations, the active cooling mechanism includes a set of one or more exhaust fans. In some embodiments, an exhaust fan is placed proximal to (e.g., adjacent to, along a flow axis of, etc.) an air outlet (e.g., exhaust) of the camera system and/or camera system housing. In a specific example, an exhaust fan is placed within a cavity of a housing of the camera system. This can function to define an air flow path from an air inlet fluidly connected to an interior of the camera system housing, around the camera system components, and then out through an air outlet proximal to the exhaust fan.

Additionally or alternatively, the camera cooling mechanism can include any other suitable active cooling components.

2.6 System: Camera Cooling Mechanism—Camera Removal System.

Figure 11:
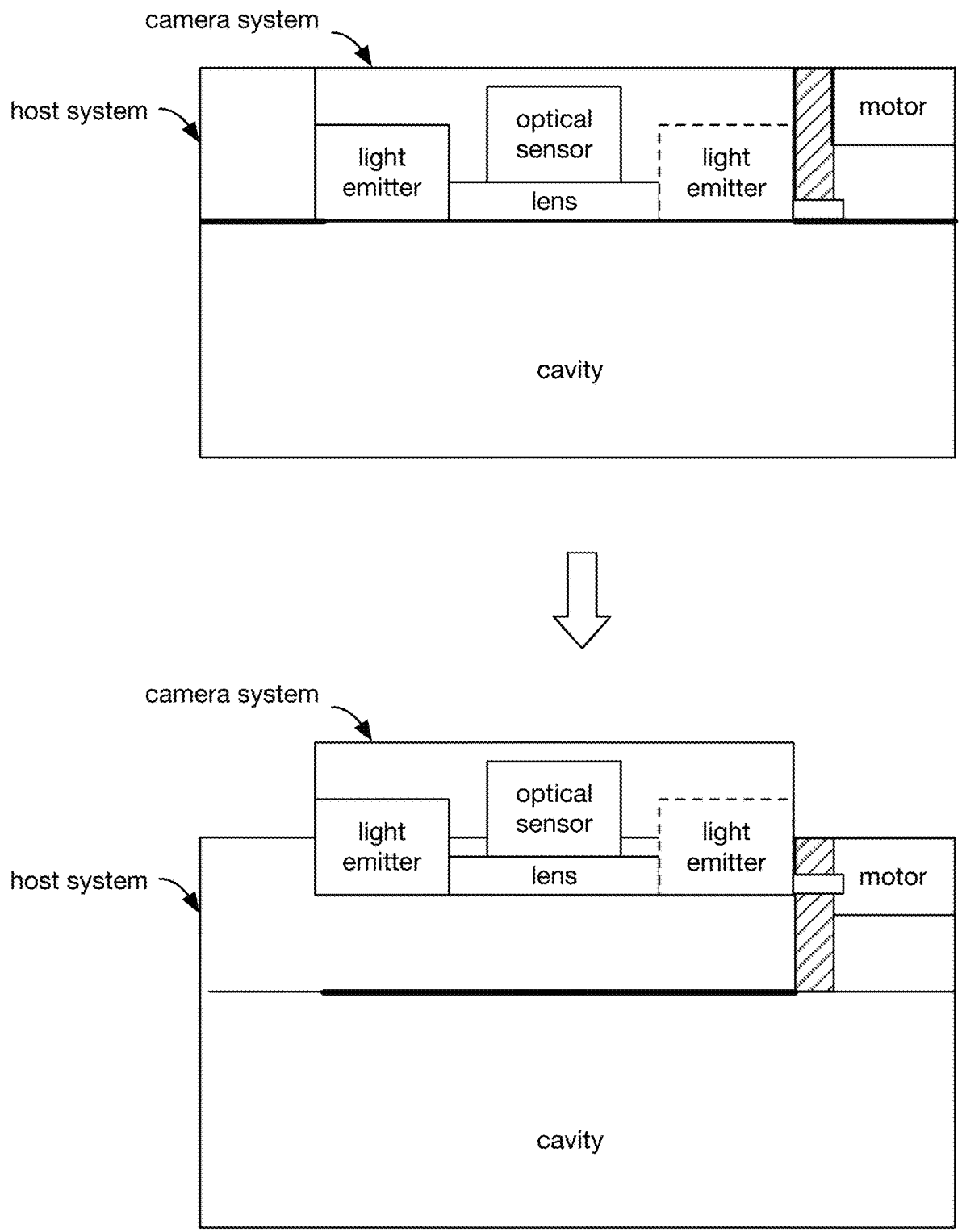
FIG. 11 is a schematic representation of an example of an active camera removal system with an actuatable heat shield.

The camera cooling mechanism can include a camera removal system that enables physical camera system removal from the host system (e.g., cooking appliance). In a first embodiment, the camera removal system includes a linear actuator arranged perpendicular the lens plane and/or an internal cavity wall). The linear actuator preferably retracts the camera system into the cavity wall and/or out of the host system body, and can optionally replace the camera system in the imaging position after retraction. The linear actuator is preferably an electro-mechanical actuator, such as a traveling-nut linear actuator (e.g., wherein the nut is statically mounted to the camera system), a traveling-screw linear actuator (e.g., wherein the screw is statically mounted to the camera system), but can alternatively be a linear motor, pneumatic actuator, or any suitable actuator. In this embodiment, the camera removal system can optionally include a heat shield that seals the camera system lumen after camera system retraction (example shown in FIG. 11). The camera cooling mechanism can be part of the camera enclosure, coupled to the camera enclosure, or otherwise integrated or mounted to the camera enclosure.

Figure 12:
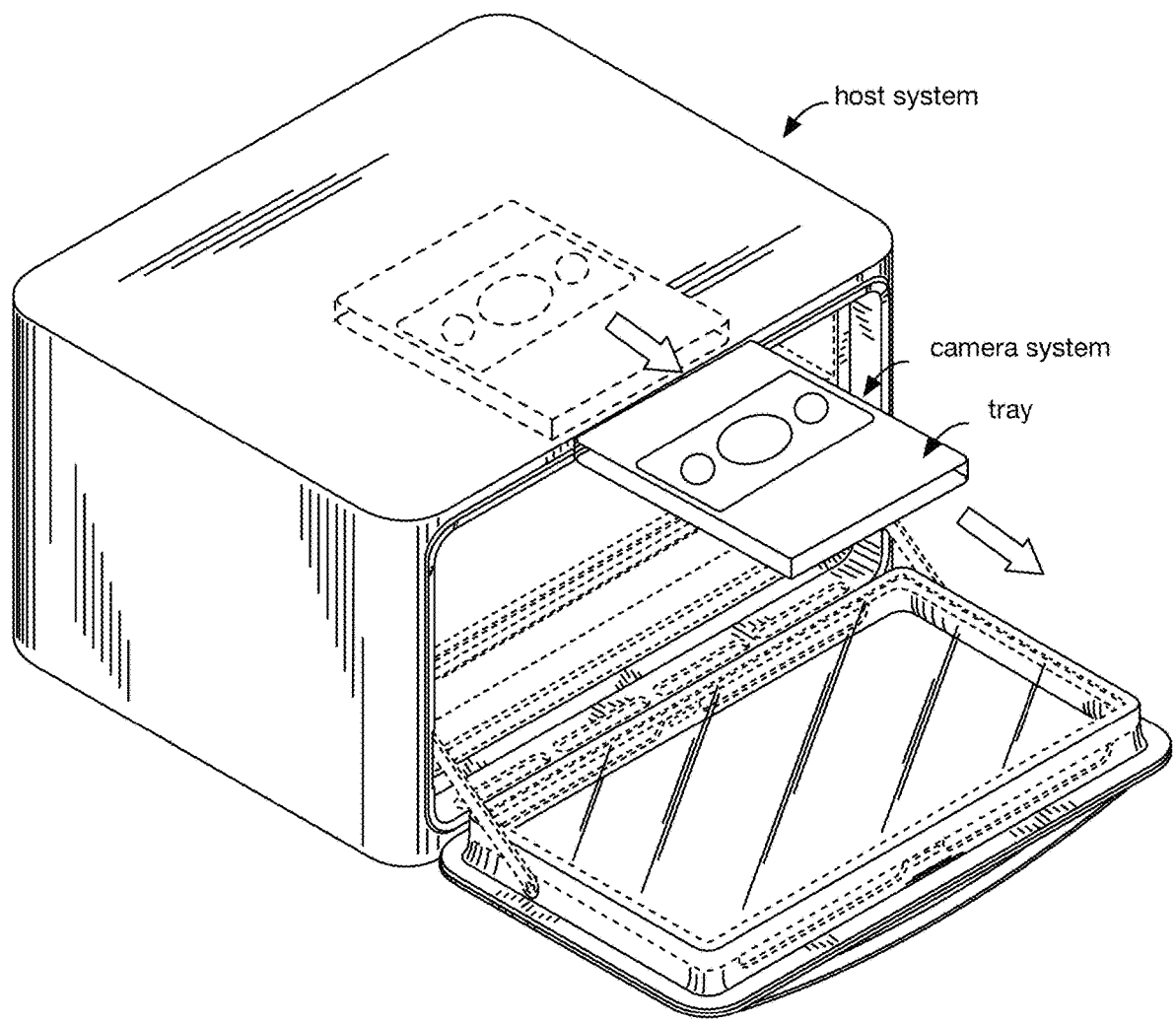
FIG. 12 is a schematic representation of an example of an active camera removal system with the camera system on a removable tray.
Figure 13A:
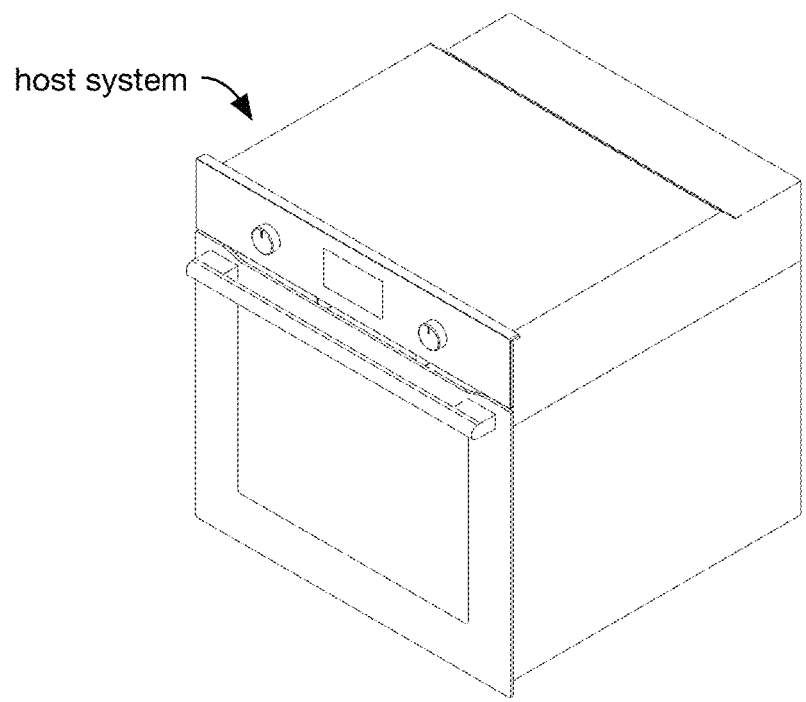
Figure 13B:
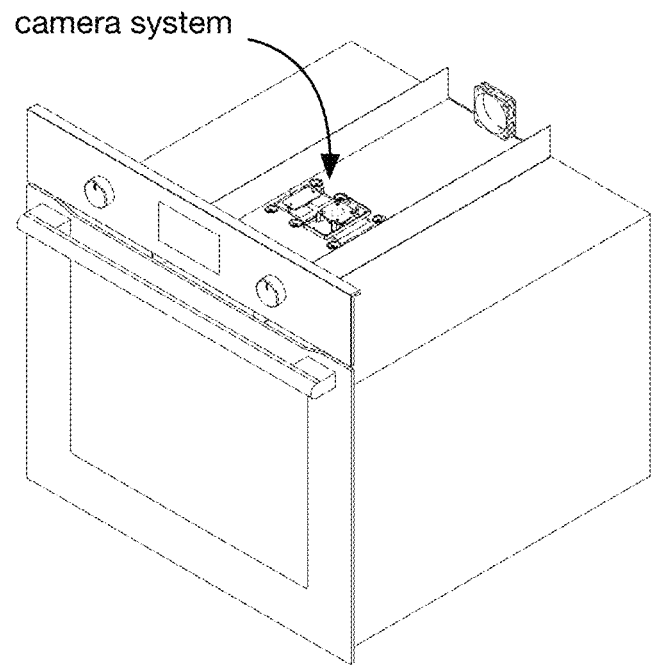
Figure 13C:
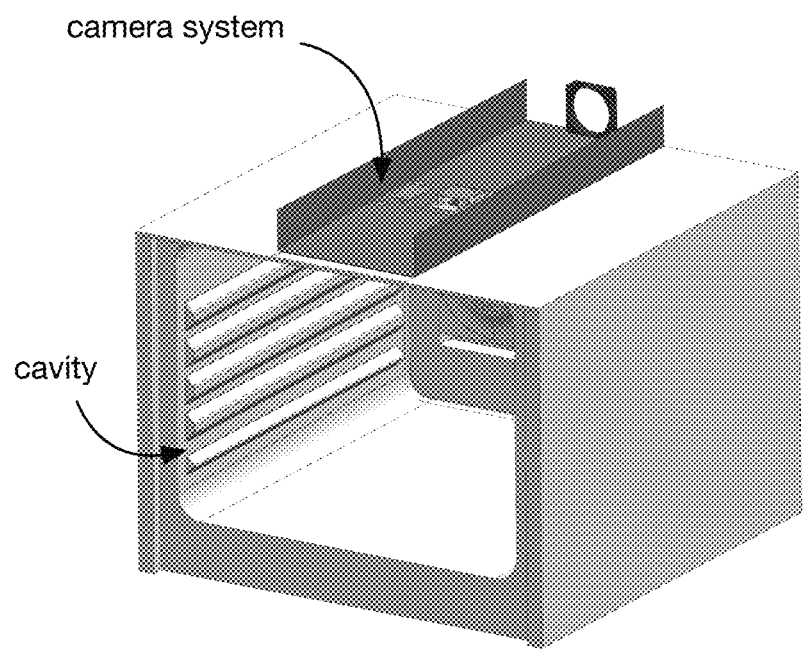
Figure 13D:
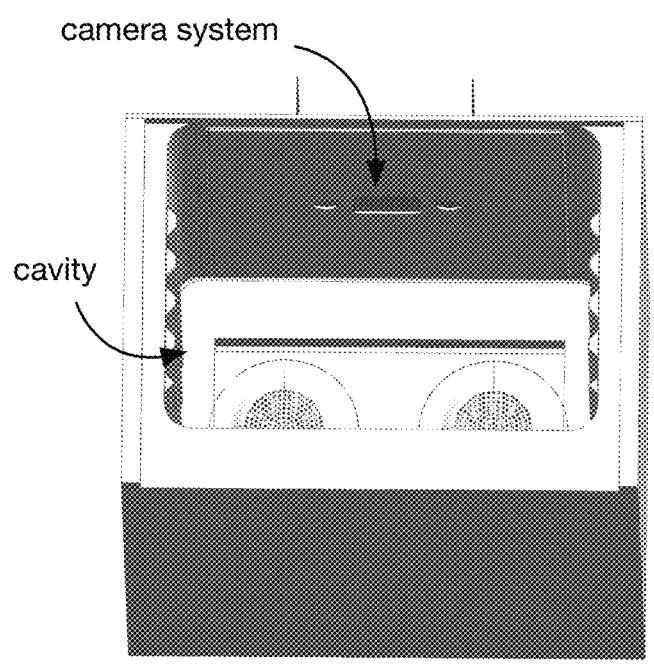
Figure 14C:
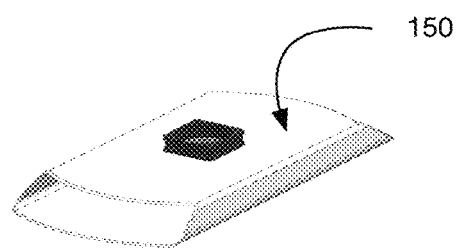
Figure 14D:
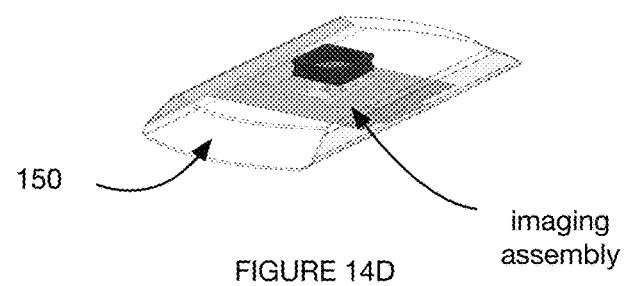
Figure 14E:
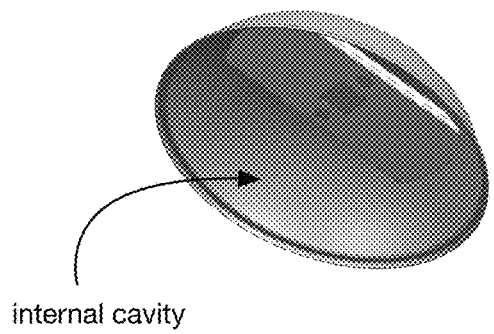
Figure 15A:
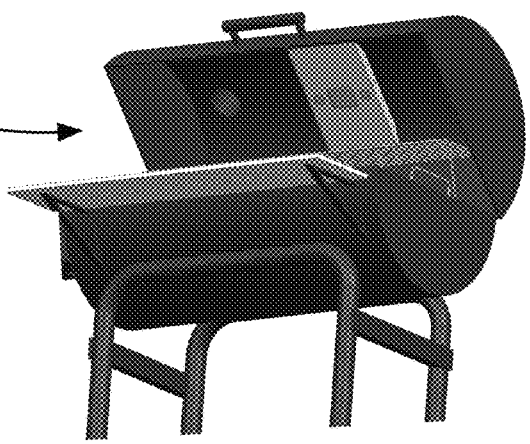
FIGS. 15A-15E are schematic representations of a second example of a host system, including: an isometric view of the assembled host system, a transparent view of the cover, an isometric view of the grill cover, an example of the camera system for the host system, and an isometric view of the host system cover from the bottom left.
Figure 15B:
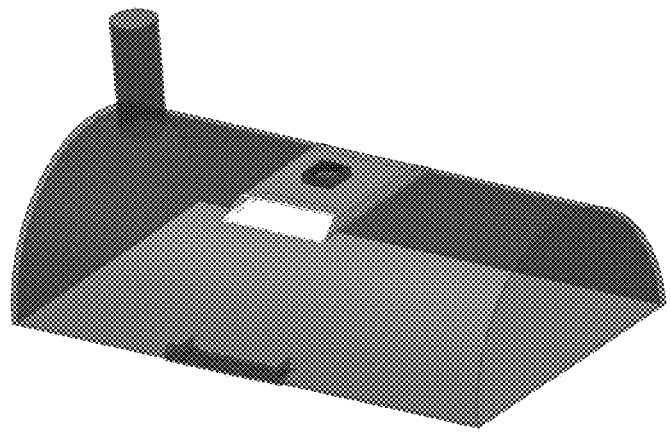
Figure 15C:
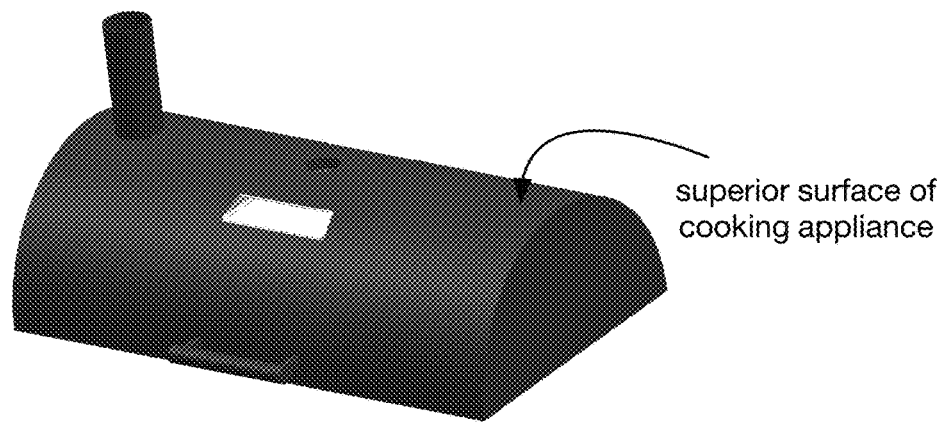
Figure 15D:
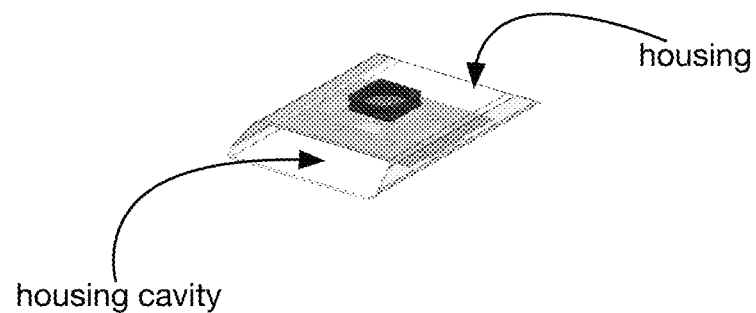
Figure 15E:
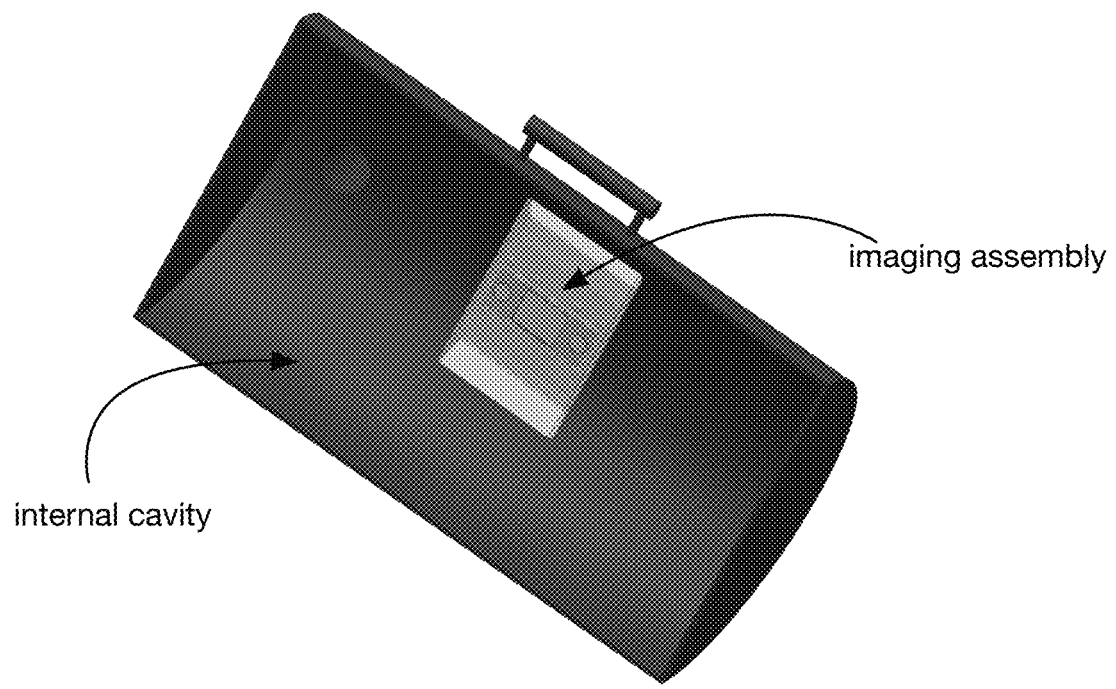

In a second embodiment of the third variation, the camera removal system includes a tray, mounting the entire camera system, that slides out of the host system (example shown in FIG. 12). The tray can be manually removed, automatically removed (e.g., by a linear actuator), or otherwise removed. The tray can slide out of the host system front (e.g., form a portion of the door jamb), side, top, or from any other suitable portion of the host system. In this variation, the tray can optionally include external power and/or data connectors, electrically connected to the camera system within the tray, that engage complimentary power and/or data connectors in the host system body.

In a fourth variation, the camera cooling mechanism includes the control system (processing system), which dynamically adjusts host system operation (e.g., throttles host system performance) based on the camera system's measured, estimated, or anticipated temperature. For example, the control system can temporarily decrease the cavity temperature (e.g., by shutting off the heating elements, such as carbon heating elements) when a camera system component reaches a threshold component temperature or has been held at a given temperature for more than a predetermined duration. However, the control system can otherwise adjust host system operation to accommodate camera system thermal requirements.

However, the camera system can include any suitable camera cooling mechanism.

2.7 System: Variations.

In a first variation of the system, the camera cooling mechanism includes multiple cooling systems configured to both reduce the transfer of heat to the camera system from a first internal cavity as well as increase the transfer of heat generated by the camera system to the ambient environment. In a specific example, the system includes a transparent or semi-transparent heat shield (e.g., glass heat shield with a coating configured to block radiation) arranged underneath the camera system configured to minimize heat transfer from the oven cavity to the camera system while still permitting the camera to sample images of the internal cavity; a thermally conductive camera system housing, where the heat generated by the camera system is transferred to the thermally conductive housing; and an exhaust fan arranged in the camera system housing configured to define an air flow path from the ambient environment, through an air inlet, through the cavity defined by the camera system housing, and back out to the ambient environment through an air outlet arranged proximal to the exhaust fan.

In an alternative variation of the system, the camera system housing is made from one or more non-conductive (e.g., insulative) materials.

In some variations of the system, the system is integrated into a host system (e.g., oven) having multiple internal cavities.

In a specific embodiment of these variations (e.g., as shown in FIGS. 16A-16F), the system is placed in an oven host system having a first internal cavity configured to receive and cook a food item, where the system includes: a camera system configured to sample images of a top-down view of the food item; a housing defining a housing interior, wherein the camera system is configured to be arranged within the housing interior (and optionally separated from the first internal cavity through a heat shield), and wherein the housing is placed within a second internal cavity of the oven host system. The second internal cavity is preferably fluidly isolated from the first internal cavity by one or more interior panels of the oven host system and configured to cool a subsystem (e.g., display arranged in the door) of the oven host system separate from the camera system. Alternatively, the second internal cavity can be otherwise arranged (e.g., fluidly connected with the first internal cavity).

In another variation (e.g., as shown in FIGS. 14A-14E), the camera system and associated camera system housing are attached to the host system (e.g., grill) through a lid of the host system, wherein coupling of the lid to the remaining host system defines a main internal cavity of the host system.

In some variations of the system, the camera system is modular. In a first embodiment, the camera system is configured to be installed in a variety of host system types (e.g., oven and grill). In a specific example of this embodiment, the housing of the camera system includes a tray configured to be installed into various host system cavities. In another embodiment, the camera system is configured to be installed into a particular host system type, but can be easily replaced (e.g., if damaged, due to wear-and-tear, etc.) due to its particular arrangement within the host system (e.g., requiring removal of only exterior host system panels) and/or based on the arrangement of the camera system components within a camera system housing (e.g., fully enclosed, partially enclosed, etc.). In a third embodiment, the camera system can be coupled to and removed from the host system on a regular basis (e.g., weekly, monthly, during deep cleaning cycles, when the temperature inside the host system reaches a predetermined threshold, etc.) through a camera removal system, such as a tray, motorized platform, or any other suitable mechanism.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

As a person skilled in the art will recognize from the previous detailed description and from the figures and claims, modifications and changes can be made to the preferred embodiments of the invention without departing from the scope of this invention defined in the following claims.

We claim:

1. A connected cooking appliance comprising:
   a sensor;
   a housing comprising a thermally conductive material arranged at a superior end of an internal cooking cavity of the connected cooking appliance, the housing defining a housing cavity fluidly coupled to an air inlet,
   wherein the housing is configured to locate the sensor at a mounting point superior to the cooking cavity, an air gap separating the sensor from the thermally conductive material;
   a heat shield coupled to an inferior broad end of the housing; and
   a fan arranged in the housing cavity, wherein the housing and the fan cooperatively define a flow path between the air inlet and an air outlet.

2. The connected cooking appliance of claim 1, wherein the heat shield fluidly isolates the housing cavity from the internal cooking cavity and optically connects the internal cooking cavity to the housing cavity.

3. The connected cooking appliance of claim 1, wherein the sensor comprises an electromagnetic receiver.

4. The connected cooking appliance of claim 3, wherein the sensor is an optical sensor having a field of view directed toward an inferior surface of the first internal cavity.

5. The connected cooking appliance of claim 4, further comprising a lens arranged between the optical sensor and the heat shield.

6. The connected cooking appliance of claim 1, wherein the heat shield is substantially transparent to a first regime of electromagnetic radiation wavelength and substantially opaque to a second portion of electromagnetic radiation wavelengths.

7. The connected cooking appliance of claim 1, wherein the heat shield is configured to be aligned over an aperture defined by the superior surface defining the first internal cavity.

8. The connected cooking appliance of claim 1, wherein the heat shield comprises an infrared coating arranged on an inferior broad surface of the heat shield.

9. The connected cooking appliance of claim 1, wherein the flow path extends along a superior-inferior axis of the cooking appliance at the inlet or the outlet.

10. The connected cooking appliance of claim 9, wherein the flow path defines substantially perpendicular directions of flow at the air inlet and the air outlet.

11. The connected cooking appliance of claim 1, wherein the housing is operable in a set of configurations, the set of configurations comprising:
    a coupled configuration, wherein the housing is coupled to the cooking appliance and arranged the internal cooking cavity second internal cavity of the cooking appliance, wherein the housing is configured to locate the sensor at the mounting point in the coupled configuration; and
    an uncoupled configuration, wherein the housing is arranged outside the cooking appliance.

12. The connected cooking appliance of claim 11, wherein transitioning between the coupled and uncoupled configurations comprises translating the housing along a superior-inferior axis.

13. The connected cooking appliance of claim 1, wherein the housing further comprises a plurality of extended surfaces arranged along the flow path and thermally coupled to the thermally conductive material.

14. The connected cooking appliance of claim 13, wherein the extended surfaces are thermally coupled to a light emitter, the light emitter defining an emission vector oriented towards the heat shield.

15. The connected cooking appliance of claim 1, wherein the mounting point is a central point of a superior surface defining the internal cooking cavity.

16. The connected cooking appliance of claim 1, wherein the sensor comprises a camera having a field of view directed toward an inferior surface of the first internal cavity and configured to sample a set of images of a superior surface of a food item arranged within the internal cooking cavity.

17. The connected cooking appliance of claim 1, further comprising a wireless communication system within the housing and communicatively coupled to the sensor.

18. The connected cooking appliance of claim 1, further comprising a processor communicatively within the housing and coupled to the sensor.

19. The connected cooking appliance of claim 1, wherein the fan comprises an exhaust fan arranged proximal to the air outlet.

20. The connected cooking appliance of claim 1, wherein the housing is configured to be selectively decoupled from the internal cooking cavity in response to satisfaction of a temperature threshold of the sensor.

* * * * *